(12) United States Patent
Tayagaki et al.

(10) Patent No.: US 9,663,626 B2
(45) Date of Patent: May 30, 2017

(54) HEAT-EXPANDABLE MICROSPHERES, PROCESS FOR PRODUCING THE SAME, AND APPLICATION THEREOF

(71) Applicant: MATSUMOTO YUSHI-SEIYAKU CO., LTD., Yao-shi, Osaka (JP)

(72) Inventors: Naoya Tayagaki, Yao (JP); Yasuyuki Nomura, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 11 days.

(21) Appl. No.: 14/366,200

(22) PCT Filed: Jan. 21, 2013

(86) PCT No.: PCT/JP2013/051021
§ 371 (c)(1),
(2) Date: Jun. 17, 2014

(87) PCT Pub. No.: WO2013/111688
PCT Pub. Date: Aug. 1, 2013

(65) Prior Publication Data
US 2014/0364521 A1    Dec. 11, 2014

(30) Foreign Application Priority Data

Jan. 25, 2012   (JP) ................... 2012-012723

(51) Int. Cl.
*C08J 9/20*   (2006.01)
*C08F 2/44*   (2006.01)
(Continued)

(52) U.S. Cl.
CPC ............... *C08J 9/20* (2013.01); *B01J 13/185* (2013.01); *C08F 2/20* (2013.01); *C08F 2/44* (2013.01);
(Continued)

(58) Field of Classification Search
CPC .................................................. C08J 2203/22
See application file for complete search history.

(56) References Cited

U.S. PATENT DOCUMENTS 3,615,972 A   10/1971 Morehouse et al.
5,155,138 A   10/1992 Lundqvist
(Continued)

FOREIGN PATENT DOCUMENTS

CN   101263183 A   9/2008
EP   1952881 A1   8/2008
(Continued)

OTHER PUBLICATIONS

Machine translation of JP H09013014. Nishihara et al, 1997.*
(Continued)

*Primary Examiner* — Mike M Dollinger
*Assistant Examiner* — Christina Wales
(74) *Attorney, Agent, or Firm* — Global IP Counselors, LLP

(57) ABSTRACT

Heat-expandable microspheres with high encapsulation efficiency of a blowing agent and good heat-expansion performance, a process for reproducibly producing the heat-expandable microspheres and application thereof are provided. The heat-expandable microspheres comprise essentially a thermoplastic resin shell and a blowing agent encapsulated therein, and contain not more than 500 ppm of silicon, not more than 350 ppm of aluminum and not more than 600 ppm of the total of the silicon and aluminum. The heat-expandable microspheres retain at least 70% of the blowing agent encapsulated therein at the temperature which is the average of their expansion-initiation temperature and maximum expansion temperature.

10 Claims, 1 Drawing Sheet

(51) Int. Cl.
    *C09J 11/00*     (2006.01)
    *C08F 2/20*     (2006.01)
    *C08J 9/00*     (2006.01)
    *C08F 220/48*     (2006.01)
    *C08J 9/228*     (2006.01)
    *C09J 11/08*     (2006.01)
    *B01J 13/18*     (2006.01)
    *C08K 7/22*     (2006.01)
    *C08F 218/08*     (2006.01)
    *C08F 220/18*     (2006.01)
    *C08F 220/56*     (2006.01)
    *C08F 222/38*     (2006.01)

(52) U.S. Cl.
    CPC ........... *C08F 220/48* (2013.01); *C08J 9/0066* (2013.01); *C08J 9/228* (2013.01); *C09J 11/00* (2013.01); *C09J 11/08* (2013.01); *C08F 218/08* (2013.01); *C08F 220/18* (2013.01); *C08F 220/56* (2013.01); *C08F 222/38* (2013.01); *C08J 2203/22* (2013.01); *C08J 2333/18* (2013.01); *C08J 2333/20* (2013.01); *C08K 7/22* (2013.01)

(56) References Cited

U.S. PATENT DOCUMENTS

| | | | |
|---|---|---|---|
| 2009/0149559 A1* | 6/2009 | Masuda | ................ B01J 13/14 521/56 |
| 2009/0280328 A1 | 11/2009 | Masuda et al. | |
| 2012/0121907 A1 | 5/2012 | Masuda et al. | |
| 2013/0065976 A1 | 3/2013 | Morita et al. | |
| 2015/0083646 A1* | 3/2015 | Didden | ................ B03D 1/023 209/10 |

FOREIGN PATENT DOCUMENTS

| | | |
|---|---|---|
| EP | 2151456 A1 | 2/2010 |
| EP | 2441814 A1 | 4/2012 |
| JP | H4-292643 A | 10/1992 |
| JP | 2007-077225 A | 3/2007 |
| JP | 2009-540047 A | 11/2009 |
| JP | 2011-068890 A | 4/2011 |
| JP | 2011-074339 A | 4/2011 |
| JP | 2011-144291 A | 7/2011 |
| JP | 2011-195813 A | 10/2011 |
| JP | 2011-256224 A | 12/2011 |
| WO | 2007-142593 A1 | 12/2007 |
| WO | 2011-122229 A1 | 10/2011 |

OTHER PUBLICATIONS

Partial Supplementary European Search Report of the corresponding European Patent Application No. 13741152.6, dated Sep. 4, 2015.
Office Action of the corresponding Japanese Patent Application No. 2013-516863, dated Jul. 2, 2013.
Office Action of the corresponding Japanese Patent Application No. 2013-089239, dated Jul. 2, 2013.
Office Action of the corresponding Japanese Patent Application No. 2013-089239, dated Sep. 17, 2013.

* cited by examiner

HEAT-EXPANDABLE MICROSPHERES, PROCESS FOR PRODUCING THE SAME, AND APPLICATION THEREOF

TECHNICAL FIELD

The present invention relates to heat-expandable microspheres, a process for producing the same, and application thereof.

BACKGROUND ART

Heat-expandable microspheres each comprises essentially an outer shell (shell) of a thermoplastic resin and a blowing agent (core) encapsulated therein. Such heat-expandable microspheres are produced in a process, for example, suspension polymerization of a polymerizable component, in the presence of a blowing agent, in an aqueous dispersion medium comprising colloidal silica as a dispersion stabilizer (Refer to Japanese Patent Document JP-B-42-26524).

Currently, colloidal silica is an indispensable material for producing heat-expandable microspheres owing to its excellent dispersion stability. Unfortunately, colloidal silica often causes difficulty in dehydration (or filtration) of a reaction mixture after suspension polymerization, which is performed for taking out heat-expandable microspheres from the reaction mixture. In addition, colloidal silica remains on the surface of heat-expandable microspheres and it is well known that complete removal of the colloidal silica is difficult. The colloidal silica remaining on heat-expandable microspheres can cause poor adhesion between a resin and the heat-expandable microspheres in a composition comprising the resin and heat-expandable microspheres.

Recently a demand for lighter adhesive compositions is emerging, because of environmental concern and saving resin (adhesive components) in the compositions. For meeting such demand, adhesive compositions comprising hollow microspheres (plastic microballoon) manufactured by heating and expanding heat-expandable microspheres have been used, though such adhesive compositions are apt to be non-uniformly cured into materials having excessive hardness and poor elongation.

Suspension polymerization for producing heat-expandable microspheres is often performed in an acidic aqueous dispersion medium having a pH ranging from 1 to 4 when colloidal silica is used as a dispersion stabilizer. In addition, a metal reactor is usually used for the production of heat-expandable microspheres because of polymerization scale, and the use of colloidal silica inevitably causes a problem relating to the corrosion resistance of the reactor.

For solving such problem, a suspension polymerization in a neutral or basic aqueous dispersion medium comprising magnesium hydroxide or calcium phosphate as a dispersion stabilizer has been proposed (refer to Japanese Patent Document JP-A-4-292643). For improving the process with an aqueous dispersion medium comprising magnesium hydroxide, suspension polymerization in an aqueous dispersion medium further comprising a polyanion compound has also been proposed (refer to Japanese Patent Document JP-A-2011-144291).

The process in Japanese Patent Document JP-A-4-292643 further requires a dispersion-stabilizing auxiliary. Without the dispersion-stabilizing auxiliary, oil globules comprising a polymerizable component and blowing agent are not stably dispersed in an aqueous dispersion medium and the process cannot reproducibly produce heat-expandable microspheres. In addition, a nonionic emulsifier of a polyethylene glycol condensate, which has a clouding point, greatly impairs the reproducibility of suspension polymerization when it is used as the dispersion-stabilizing auxiliary. Other dispersion-stabilizing auxiliaries, such as anionic compounds including alkaline compounds of fatty acids, sulfonate salts and alkyl sulfates and polyanion compounds in Japanese Patent Document JP-A-2011-144291, also result in poor reproducibility of suspension polymerization. Those compounds react with metallic cations such as sodium from sodium chloride or magnesium from magnesium chloride added to the aqueous dispersion medium to deteriorate the surface-active property of the medium and the dispersion stability of the oily globules. Thus the processes in Japanese Patent Document JP-A-4-292643 and Japanese Patent Document JP-A-2011-144291 produce heat-expandable microspheres with low encapsulation efficiency of blowing agents and the resultant heat-expandable microspheres have poor heat-expansion performance.

SUMMARY OF INVENTION

Technical Problem

The object of the present invention is to provide heat-expandable microspheres comprising a blowing agent with high encapsulation efficiency and having high heat-expansion performance, a process for reproducibly producing the same, and application thereof.

Solution to Problem

For solving the problems mentioned above, the inventors of the present invention have studied to find that the problems can be solved by a process of producing heat-expandable microspheres using a fine-particle metal compound and an amphoteric surfactant to make a neutral or basic aqueous dispersion medium for suspension polymerization and heat-expandable microspheres produced in such process, and thus have achieved the present invention.

The heat-expandable microspheres of the present invention comprise essentially a shell of thermoplastic resin and a blowing agent encapsulated therein. The microspheres contain not more than 500 ppm of silicon, not more than 350 ppm of aluminum, and not more than 600 ppm of silicon and aluminum in total. The ratio of a blowing agent retained in the heat-expandable microspheres (the retention ratio of a blowing agent) is at least 70% at the temperature which is the average of the expansion-initiation temperature and maximum expansion temperature of the heat-expandable microspheres.

The heat-expandable microspheres of the present invention should preferably contain not more than 20000 ppm of magnesium and not more than 3.0 wt % of ash.

The process for producing heat-expandable microspheres of the present invention produces heat-expandable microspheres comprising essentially a shell of thermoplastic resin and a blowing agent encapsulated therein. The process includes the steps of dispersing a polymerizable component and the blowing agent in a neutral or basic aqueous dispersion medium comprising a fine-particle metal compound and amphoteric surfactant and polymerizing the polymerizable component.

The process for producing heat-expandable microspheres of the present invention should preferably meet at least one of the requirements (A) to (H) mentioned below:

(A) the fine-particle metal compound is in a colloidal state, (B) the aqueous dispersion medium has a pH ranging from 7 to 12, (C) the metal in the metal compound is an alkaline earth metal, (D) the amphoteric surfactant is a betaine amphoteric surfactant, (E) the encapsulation efficiency of the blowing agent is at least 90% in the heat-expandable microspheres, (F) the polymerizable component contains at least one component selected from the group consisting of nitrile monomers, (meth)acrylate monomers, carboxyl-group-comprising monomers, styrene monomers, vinyl acetate, acrylamide monomers, maleimide monomers and vinylidene chloride;

(G) the process further comprises a step of decreasing a pH of the heat-expandable microspheres produced in the polymerization step, and (H) the process further comprises a step of washing the heat-expandable microspheres after the polymerization step or the pH decreasing step.

Microballoons of the present invention are produced by heating and expanding the heat-expandable microspheres mentioned above and/or the heat-expandable microspheres produced in the process mentioned above. Each of the microballoons should preferably be coated with fine particles on its outer surface.

A composition of the present invention comprises at least one particulate material selected from the group consisting of heat-expandable microspheres mentioned above, the heat-expandable microspheres produced in the process mentioned above and the microballoons mentioned above, and a base component. The composition should preferably be an adhesive composition.

A formed article of the present invention is manufactured by forming the composition mentioned above.

Advantageous Effects of Invention

The heat-expandable microspheres of the present invention contain a blowing agent with high encapsulation efficiency and have excellent heat-expansion performance.

The heat-expandable microspheres of the present invention effectively improve the properties of a composition containing the microspheres.

The process for producing the heat-expandable microspheres of the present invention reproducibly produces heat-expandable microspheres containing a blowing agent with high encapsulation efficiency and having excellent heat-expansion performance.

The microballoons of the present invention produced by processing the heat-expandable microspheres are lightweight and effectively achieve excellent properties of a composition or formed article comprising the microballoons.

The composition of the present invention is lightweight and has excellent properties owing to the heat-expandable microspheres and/or microballoons contained therein.

The formed article of the present invention, which is manufactured by forming the composition, is lightweight and has excellent properties.

An adhesive composition comprising the microballoons of the present invention has excellent properties, i.e., low hardness and high elongation after curing.

DESCRIPTION OF EMBODIMENTS

Process for Producing Heat-expandable Microspheres

Figure 1:
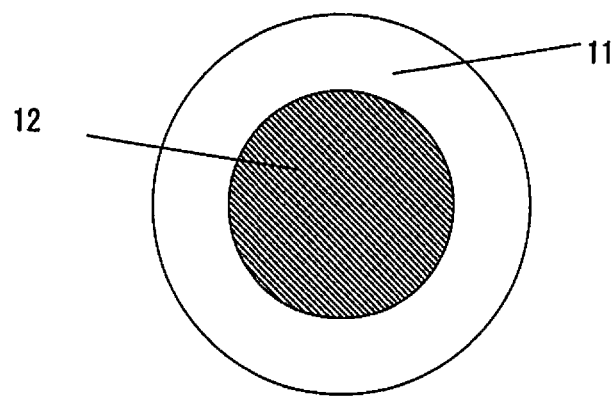
FIG. 1: Schematic diagram illustrating a heat-expandable microsphere of the present invention

The process of the present invention produces heat-expandable microspheres comprising essentially a shell of a thermoplastic resin and a blowing agent encapsulated therein. The process comprises a step of dispersing a polymerizable component and the blowing agent in a neutral or basic aqueous dispersion medium comprising a fine-particle metal compound and amphoteric surfactant and polymerizing the polymerizable component (hereinafter referred to as polymerization step).

The process of the present invention should preferably include a step of decreasing a pH of the heat-expandable microspheres produced in the polymerization step (hereinafter referred to as pH decreasing step), and a step of washing the heat-expandable microsphere produced in the polymerization step or after the pH decreasing step with water (hereinafter referred to as washing step).

Polymerization Step

The blowing agent is a thermally vaporizable substance, and includes, for example, $C_1$-$C_{12}$ hydrocarbons and their halides; tetraalkylsilanes; and compounds which generate gases by thermal decomposition. One of or a combination of at least two of the substances can be employed for the blowing agent.

The $C_1$-$C_{12}$ hydrocarbons include, for example, propane, cyclopropane, propylene, n-butane, isobutane, cyclobutane, n-pentane, cyclopentane, isopentane, neopentane, n-hexane, isohexane, cyclohexane, heptane, cycloheptane, octane, isooctane, cyclooctane, 2-methyl pentane, 2,2-dimethylbutane and petroleum ether. Those hydrocarbons can be linear, branched or alicyclic, and are preferably aliphatic.

The polymerizable component is polymerized in the presence of a polymerization initiator to be made into a thermoplastic resin forming the shell of heat-expandable microspheres. The polymerizable component comprises essentially a monomer component and optionally contains a cross-linking agent.

The monomer component generally means a (radically) polymerizable monomer having one polymerizable double bond. The polymerizable monomer is not specifically restricted, and includes for example, nitrile monomers such as acrylonitrile, methacrylonitrile, α-chloroacrylonitrile, α-ethoxyacrylonitrile and fumaronitrile; carboxyl-group-comprising monomers such as acrylic acid, methacrylic acid, itaconic acid, maleic acid, fumaric acid and citraconic acid; vinylidene chloride; halogenated vinyl monomers, such as vinyl chloride, vinyl bromide and vinyl fluoride; vinyl ester monomers, such as vinyl acetate, vinyl propionate and vinyl butyrate; (meth)acrylate monomers, such as methyl (meth)acrylate, ethyl (meth)acrylate, n-butyl (meth)acrylate, isobutyl (meth)acrylate, t-butyl (meth)acrylate, propyl (meth)acrylate, n-octyl (meth)acrylate, dodecyl (meth)acrylate, 2-ethylhexyl (meth)acrylate, stearyl (meth)acrylate, 2-chloroethyl(meth)acrylate, phenyl (meth)acrylate, isobornyl (meth)acrylate, cyclohexyl (meth)acrylate, benzyl (meth)acrylate, β-carboxyethyl acrylate, 2-hydroxyethyl (meth)acrylate, and 2-hydroxypropyl (meth)acrylate; styrene monomers, such as styrene, α-methyl styrene and chlorostyrene; acrylamide monomers, such as acrylamide, substituted acrylamide, methacrylamide and substituted methacrylamide; maleimide monomers, such as N-phenyl maleimide, N-(2-chlorophenyl) maleimide, N-cyclohexyl maleimide and N-lauryl maleimide; styrene monomers, such as styrene, o-methylstyrene, m-methylstyrene, p-methylstyrene, p-ethylstyrene, 2,4-dimethyl styrene, p-n-butylstyrene, p-tert-butylstyrene, p-n-hexylstyrene, p-n-octylstyrene, p-n-nonylstyrene, p-n-decylstyrene, p-n-dodecylstyrene, n-methoxystyrene, p-phenylstyrene, p-chlorostyrene and 3,4-dichlorostyrene; ethylenically unsaturated monoolefin monomers, such as ethylene, propylene, butylene and isobutylene; vinyl ether monomers, such as vinyl methyl ether, vinyl ethyl ether and vinyl isobutyl ether; vinyl ketone monomers, such as vinyl methyl ketone, vinyl hexyl ketone and methyl isopropenyl ketone; N-vinyl monomers, such as N-vinyl pyrrole, N-vinyl carbazole, N-vinyl indole and N-vinyl pyrolidone; and vinylnaphthalene salts. The carboxyl groups in the carboxyl-group-comprising monomers can be neutralized partially or wholly in the polymerization. The term, (meth)acryl, means acryl or methacryl. The maleimide monomers should preferably be N-substituted maleimide monomers that contain a nitrogen atom having a substituent.

One or a combination of at least two of the radically polymerizable monomers can be used for preparing the polymerizable component. A preferable polymerizable component contains at least one monomer selected from nitrile monomers, (meth)acrylate monomers, carboxyl-group-comprising monomers, styrene monomers, vinyl acetate, acryl amide monomers, maleimide monomers and vinylidene chloride.

A polymerizable component comprising essentially a nitrile monomer is preferable for improving heat and solvent resistance of the thermoplastic resin constituting the shell of heat-expandable microspheres. The nitrile monomer should preferably include acrylonitrile and/or methacrylonitrile for improving the gas impermeability of the shell and expansion performance of resultant heat-expandable microspheres. The ratio of methacrylonitrile in the nitrile monomer should preferably range from 5 to 90 wt %, more preferably from 15 to 80 wt % and most preferably from 20 to 70 wt %. A nitrile monomer comprising methacrylonitrile in a ratio within the range improves the film-forming performance of thermoplastic resin and the density of shell so as to contribute to high expansion performance of heat-expandable microsphere.

A polymerizable component comprising a halogenated vinyl monomer and/or (meth)acrylate monomer in addition to a nitrile monomer is preferable. A polymerizable component comprising a halogenated vinyl monomer such as vinylidene chloride contributes to improved gas impermeability of the shell of heat-expandable microspheres, and a polymerizable component comprising a (meth)acrylate monomer leads to easy control of the expansion behavior of the resultant microspheres.

A polymerizable component comprising a carboxyl-group-comprising monomer in addition to a nitrile monomer is preferable because such component improves the heat and solvent resistance of resultant thermoplastic resin and simultaneously raises the glass-transition temperature of the thermoplastic resin to make resultant heat-expandable microsphere expand at high temperature. The polymerizable component can contain a halogenated vinyl monomer and/or (meth)acrylate monomer in addition to a nitrile monomer and carboxyl-group-comprising monomer.

A polymerizable component comprising a maleimide monomer in addition to the monomers mentioned above is preferable because such polymerizable component minimizes the coloring of resultant heat-expandable microsphere.

A polymerizable component comprising monomers that contain halogens, oxygen and nitrogen is advantageous for effectively preventing the agglomeration of heat-expandable microspheres produced in polymerization and the generation of scale in a reaction vessel.

The polymerizable component can contain a polymerizable monomer having at least two polymerizable double bonds (a cross-linking agent) in addition to the monomers mentioned above. The cross-linking agent employed for the polymerization inhibits the decrease in the retention ratio of a blowing agent in heat-expandable microspheres after heat expansion so as to make the heat-expandable microspheres expand sufficiently with heat.

The cross-linking agent is not specifically restricted, and includes, for example, aromatic divinyl compounds, such as divinyl benzene; and di(meth)acrylate compounds, such as allyl methacrylate, triacrylformal, triallyl isocyanate, ethylene glycol di(meth)acrylate, diethylene glycol di(meth)acrylate, triethylene glycol di(meth)acrylate, 1,4-butanediol di(meth)acrylate, 1,9-nonanediol di(meth)acrylate, 1,10-decanediol di(meth)acrylate, PEG (200) di(meth)acrylate, PEG (400) di(meth)acrylate, PEG (600) di(meth)acrylate, trimethylolpropane trimethacrylate, glycerin dimethacrylate, dimethloltricyclodecane diacrylate, pentaerythritol tri(meth)acrylate, pentaerythritol tetraacrylate, dipentaerythritol hexaacrylate, and 2-butyl-2-ethyl-1,3-propanediol diacrylate. One of or a combination of at least two of those cross-linking agents can be used.

The amount of the cross-linking agent is not specifically restricted, and should preferably range from 0.01 to 5 parts by weight, more preferably from 0.1 to 1 parts by weight, to 100 parts by weight of the monomer component, considering the degree of cross-linking, the retention ratio of a blowing agent encapsulated in the shell of heat-expandable microspheres, and heat resistance and heat expansion of heat-expandable microspheres.

In the process of the present invention, the polymerizable component should preferably be polymerized in the presence of a polymerization initiator.

The polymerization initiator is not specifically restricted, and includes, for example, peroxides such as peroxydicarbonates, peroxyesters and diacylperoxides; and azo compounds. One of or a combination of at least two of such polymerization initiators may be used. An oil-soluble polymerization initiator, which is soluble in radically-polymerizable monomers, is preferable.

The amount of the polymerization initiator is not specifically restricted, and preferably ranges from 0.3 to 8 parts by weight, more preferably from 0.6 to 7 parts by weight, to 100 parts by weight of the monomer component.

A chain transfer agent, organic pigment, and inorganic pigment or particle having hydrophobically-modified surface can further be employed in the process of the present invention.

The aqueous dispersion medium of the present invention mainly consists of water such as deionized water, distilled water or tap water in which an oily mixture comprising a polymerizable component and blowing agent is dispersed. The aqueous dispersion medium can further contain hydrophilic organic solvent such as alcohol. The amount of the aqueous dispersion medium used is not specifically restricted, and preferably ranges from 100 to 1000 parts by weight to 100 parts by weight of a polymerizable component.

The aqueous dispersion medium of the present invention contains a fine-particle metal compound as a dispersion stabilizer for producing heat-expandable microspheres having excellent properties including heat-expansion performance. One of or a combination of at least two metal compounds can be employed.

The metal compound includes a metal salt or metal hydroxide. The metal compound is dispersed in an aqueous dispersion medium during the polymerization step. The metal compound is insoluble or hardly soluble in water. The phrase "insoluble or hardly soluble in water" in the present invention means a property of a substance soluble by less than 1 g (preferably not more than 0.8 g and more preferably not more than 0.5 g) in 100 g of water at 25° C.

The metal contained in the metal compound includes, for example, alkali metals such as lithium, sodium, potassium, rubidium, cesium and francium; alkali earth metals (metals of the Group 2 in the Periodic Table) such as beryllium, magnesium, calcium, strontium, barium and radium; transition metals such as titan, vanadium, manganese, iron, nickel, copper, zirconium and yttrium; metals of the Group 12 in the Periodic Table such as zinc and cadmium; metals of the Group 13 in the Periodic Table such as aluminum, gallium and thallium: and metals of the Group 14 in the Periodic Table such as tin and lead. Of those metals, alkali earth metals, transition metals and metals of Group 12 in the Periodic Table are preferable and alkali earth metals are more preferable.

The metal salts include halide salts such as chloride salts, bromide salts and iodide salts, sulfate salts, sulfite salts, nitrate salts, nitrite salts, carbonate salts, hydrogen carbonate salts, pyrophosphate salts, phosphate salts and phosphite salts.

The metal compounds are the salts or hydroxides of the metals mentioned above, and include, for example, iron (II) hydroxide, iron (III) hydroxide, zinc hydroxide, nickel (II) hydroxide, manganese (II) hydroxide, cadmium hydroxide, beryllium hydroxide, magnesium hydroxide, calcium hydroxide, calcium phosphate, calcium carbonate and barium sulfate. Of those compounds, salts or hydroxides of alkali earth metals such as magnesium hydroxide, calcium hydroxide, calcium phosphate, calcium carbonate and barium sulfate, are preferable for their good effect to stabilize dispersed oil globules comprising essentially a polymerizable component and blowing agent in an aqueous dispersion medium.

The amount of a fine-particle metal compound blended in an aqueous dispersion medium is not specifically restricted, and is determined according to the intended particle size of the resultant heat-expandable microspheres. The amount of a fine-particle metal compound blended in an aqueous dispersion medium preferably ranges from 0.1 to 20 parts by weight, more preferably from 1 to 10 parts by weight and most preferable from 2 to 9 parts by weight to 100 parts by weight of a polymerizable component. An amount of a fine-particle metal compound less than 0.1 parts by weight can disturb stable production of heat-expandable microspheres. On the other hand, an amount of a fine-particle metal compound more than 20 parts by weight can increase the amount of the fine-particle metal compound remaining on the surface of resultant heat-expandable microspheres and make complete removal of the metal compound difficult.

The fine-particle metal compound should preferably be in a colloidal state (i.e., the fine-particle metal compound constitutes the particles of a colloid and dispersed in a medium, e.g. water in this case) to effectively stabilize dispersed oil globules comprising essentially a polymerizable component and blowing agent in an aqueous dispersion medium.

The process for preparing a colloid of a fine-particle metal compound is not specifically restricted, and includes, for example, a process in which a water soluble metal salt is dissolved in an acidic or neutral aqueous medium mainly consisting of water, and a basic compound such as sodium hydroxide or potassium hydroxide is added to the medium.

The water-soluble metal salt mentioned herein usually contains a metallic cation and an anion. The metallic cation includes, for example, alkali metals, such as lithium, sodium, potassium, rubidium, cesium and francium; alkali earth metals (metals of the Group 2 in the Periodic Table), such as beryllium, magnesium, calcium, strontium, barium and radium; transition metals, such as titan, vanadium, manganese, iron, nickel, copper, zirconium and yttrium; metals of the Group 12 in the Periodic Table such as zinc and cadmium; metals of the Group 13 in the Periodic Table such as aluminum, gallium and thallium: and metals of the Group 14 in the Periodic Table such as tin and lead. The anion includes, for example, halide ions ($Cl^-$, $Br^-$, $I^-$ etc.) and sulfate ions ($SO_4^{2-}$).

The water-soluble metal salt includes, for example, sodium chloride, potassium chloride, magnesium chloride, calcium chloride, iron (II) chloride, iron (III) chloride, zinc chloride, aluminum chloride, lead chloride, nickel chloride, zinc sulfate, copper (II) sulfate, manganese sulfate and nickel (II) sulfate. One of or a combination of at least two of those metal salts can be employed. Of those metals salts, magnesium chloride or calcium chloride is preferable for their function of effectively stabilizing the dispersed oil globules comprising essentially a polymerizable component and blowing agent in an aqueous dispersion medium.

The aqueous dispersion medium in the process of the present invention further contains an amphoteric surfactant as a dispersion-stabilizing auxiliary to reproducibly produce heat-expandable microspheres. The amphoteric surfactant is the auxiliary for the fine-particle metal compound used as a dispersion stabilizer, and one of or a combination of at least two of such surfactants can be employed.

The process of the present invention can reproducibly produce heat-expandable microspheres with high encapsulation efficiency of a blowing agent and good heat-expansion performance by use of the combination of a fine-particle metal compound as a dispersion stabilizer and an amphoteric surfactant as a dispersion-stabilizing auxiliary.

Amphoteric surfactants exhibit properties of anionic surfactants in basic aqueous solution and a cationic surfactant in acidic aqueous solution. Amphoteric surfactants usually fall into the groups of betaine amphoteric surfactants and amino acid amphoteric surfactants.

The molecule of a betaine amphoteric surfactant contains a cation and anion and represented by the general formula (1) shown below:

$$X^+\text{-}A\text{-}Y^- \qquad (1)$$

where $X^+$ is a cation; A is a divalent organic group; and $Y^-$ is an anion.

A cation for $X^+$ in the general formula (1) is not specifically restricted, and includes, for example, a tertiary ammonium salt cation. An example of the tertiary ammonium salt cation is that represented by the general formula (2) shown below:

[Chem. 1]

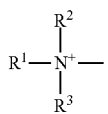
(2)

where each of $R^1$, $R^2$ and $R^3$ is an alkyl, alkenyl, aryl, alkylphenyl, imidazoline, alkylketone, alkylamine or alkylamide group or an organic group represented by the general formula (3) shown below; and $R^1$, $R^2$ and $R^3$ can be the same or different.

$$-(QO)_n\text{-}T \qquad (3)$$

where Q is a $C_1$ to $C_4$ alkylene group and preferably a $C_2$ to $C_3$ alkylene group; T is a hydrogen atom or a $C_1$ to $C_{30}$ alkyl group; n is the number of repeat unit of QO, i.e., an oxyalkylene group (mole number of added oxyalkylene) usually ranging from 1 to 30 and preferably from 1 to 20.

In the general formula (2), the number of carbon atoms of each of $R^1$, $R^2$ and $R^3$ preferably ranges from 1 to 22 and more preferably from 1 to 18.

In the general formula (1), A is a divalent organic group that is not specifically limited, and includes alkylene groups, alkylphenyl groups, polyalkylene oxide groups and polyalkylene polyamine groups. The carbon number of A preferably ranges from 1 to 10 and more preferably from 1 to 8.

$Y^-$ in the general formula (1) includes, for example, carboxylic acid anion (—COO$^-$), sulfate anion (—OSO$_3^-$) and sulfonate anion (—SO$_3^-$).

An example of the betaine amphoteric surfactants is represented by the general formula (4) shown below.

[Chem. 2]

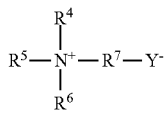
(4)

where each of $R^4$, $R^5$ and $R^6$ is a $C_1$ to $C_{22}$ organic group which is an alkyl, alkenyl or alkylphenyl group or an organic group represented by the general formula (3) shown above, and $R^4$, $R^5$ and $R^6$ can be the same or different; $R^7$ is a $C_1$ to $C_{10}$ alkylene or alkylene-phenyl group; and $Y^-$ is a carboxylic acid anion (—COO$^-$), sulfate anion (—OSO$_3^-$) or sulfonate anion (—SO$_3^-$).

The betaine amphoteric surfactant represented by the general formula (4) includes, for example, alkylaminoacetic acid betaine amphoteric surfactant, such as octyldimethylaminoacetic acid betaine, lauryldimethylaminoacetic acid betaine, stearyldimethylaminoacetic acid betaine, octyldiethylaminoacetic acid betaine, lauryldiethylaminoacetic acid betaine, stearyldiethylaminoacetic acid betaine, cocoalkyldimethylaminoacetic acid betaine and laurylhydroxyethylaminoacetic acid betaine; alkylene oxide adduct betaine amphoteric surfactant, such as N-octyl-N,N-bis (POE(m)) aminoacetic acid betaine, N-lauryl-N,N-bis (POE (m)) aminoacetic acid betaine, N-myristyl-N,N-bis (POE (m)) aminoacetic acid betaine and N-stearyl-N,N-bis (POE (m)) aminoacetic acid betaine, wherein POE of POE (m) represents polyoxyethylene group, and m is a positive integer ranging from 1 to 30 representing the mole number of POE in the adducts; sulfobetaine amphoteric surfactant, such as octyldimethyl sulfobetaine, lauryldimethyl sulfobetaine, stearyldimethyl sulfobetaine, octyldiethyl sulfobetaine, lauryldiethyl sulfobetaine, stearyldiethyl sulfobetaine, cocoalkyldimethyl sulfobetaine and laurylhydroxyethyl sulfobetaine; alkylhydroxysulfobetaine amphoteric surfactant, such as octylhydroxydimethyl sulfobetaine, octylhydroxydiethyl sulfobetaine, laurylhydroxydimethyl sulfobetaine, laurylhydroxydiethyl sulfobetaine, stearylhydroxydimethyl sulfobetaine and stearylhydroxydiethyl sulfobetaine; and sulfate betaine amphoteric surfactant, such as octyldimethylsulfate betaine, octyldiethylsulfate betaine, lauryldimethyl sulfate betaine, lauryldiethyl sulfate betaine and lauryldiethylpropyl sulfate betaine.

Another example of the betaine amphoteric surfactant is represented by the general formula (5) shown below.

[Chem. 3]

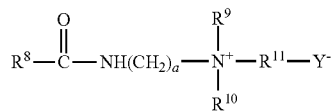
(5)

where each of $R^8$, $R^9$ and $R^{10}$ is a $C_1$ to $C_{22}$ organic group which is an alkyl, alkenyl or alkylphenyl group, and $R^8$, $R^9$ and $R^{10}$ can be the same or different; $R^{11}$ is a $C_1$ to $C_{10}$ alkylene or alkylene-phenyl group; $Y^-$ is a carboxylic acid anion (—COO$^-$), sulfate anion (—OSO$_3^-$) or sulfonate anion (—SO$_3^-$); and a represents an integer ranging from 1 to 10.

The betaine amphoteric surfactant represented by the general formula (5) includes, for example, alkylamide betaine amphoteric surfactants such as higher fatty acid amide propyldimethyl aminoacetic acid betaine amphoteric surfactant; and amidesulfobetaine amphoteric surfactant such as dodecylaminomethyldimethyl sulfopropyle betaine and octadecylaminomethyldimethyl sulfoproplyle betaine.

Yet another example of the betaine amphoteric surfactant is represented by the general formula (6) shown below.

[Chem. 4]

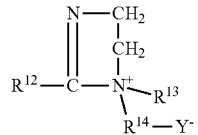
(6)

where each of $R^{12}$ and $R^{13}$ is a $C_1$ to $C_{22}$ organic group which is an alkyl, alkenyl or alkylphenyl group, and $R^{12}$ and $R^{13}$ can be the same or different; $R^{14}$ is a $C_1$ to $C_{10}$ alkylene or alkylene-phenyl group; and $Y^-$ is a carboxylic acid anion (—COO$^-$), sulfate anion (—OSO$_3^-$) or sulfonate anion (—SO$_3^-$).

The betaine amphoteric surfactant represented by the general formula (6) includes, for example, imidazolinium betaine amphoteric surfactants, such as 2-alkyl-N-carboxymethyl-N-hydroxyethyl imidazolinium betaine.

Then an amino acid amphoteric surfactant, which is another amphoteric surfactant, is described below. The amino acid amphoteric surfactant contains cation or anion at a certain pH, and is represented by the general formula (7) shown below.

$$(Z\text{-}A\text{-}COO)_r^- M^{r+} \qquad (7)$$

where A is a divalent organic group; $M^{r+}$ is a metal cation having a valence of r; and Z is a (substituted) amino group.

In the general formula (7), A is a divalent organic group the same as the A in the general formula (1).

In the general formula (7), $M^{r+}$ is a metal cation which is not specifically restricted, and the valence, r, is preferably 1 or 2. The metal cation includes, for example, alkali metal cations, such as sodium ion and potassium ion; and alkali earth metal cations, such as magnesium ion and calcium ion.

In the general formula (7), Z is an amino group or substituted amino group, which is not specifically restricted, and includes a (substituted) amino group represented by the general formula (8) shown below.

[Chem. 5]

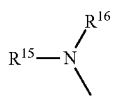
(8)

where each of $R^{15}$ and $R^{16}$ is a hydrogen atom or a $C_1$ to $C_{22}$ organic group which is an alkyl, alkenyl, aryl, alkylphenyl, imidazoline, alkylketone, alkylamine, alkylamide or alkylcarboxyl group, and $R^{15}$ and $R^{16}$ can be the same or different.

An example of the amino acid amphoteric surfactant is a fatty amino acid amphoteric surfactant represented by the general formula (9) shown below.

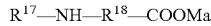
(9)

where $R^{17}$ is a $C_6$ to $C_{22}$ alkyl group; $R^{18}$ is a $C_1$ to $C_{10}$ alkylene or alkylene-phenyl group; and Ma is an alkali metal.

In the general formula (9), Ma is an alkaline metal, which is not specifically restricted, and should preferably be sodium or potassium because of their availability.

The amino acid amphoteric surfactant represented by the general formula (9) includes, for example, sodium alkylaminomonopropionate, salt such as sodium octylaminopropionate, sodium laurylaminopropionate, sodium stearylaminopropionate and sodium alkylaminodipropionate.

Another example of the amino acid amphoteric surfactant includes an aliphatic amino acid amphoteric surfactant represented by the general formula (10) shown below.

[Chem. 6]

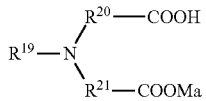
(10)

where $R^{19}$ is a $C_6$ to $C_{22}$ alkyl group; each of $R^{20}$ and $R^{21}$ is a $C_1$ to $C_{10}$ alkylene or alkylene-phenyl group, and $R^{20}$ and $R^{21}$ can be the same or different; and Ma is an alkali metal.

In the general formula (10), Ma is an alkaline metal, which is not specifically restricted, and preferably sodium or potassium because of their availability.

The amino acid amphoteric surfactant represented by the general formula (10) includes, for example, sodium alkylaminodipropionate salt such as, sodium β-laurylaminodipropionate.

Betaine amphoteric surfactants are preferable for the amphoteric surfactant of the present invention, because the surfactants exhibit excellent surface-active property in any of acidic, neutral and basic dispersion medium. Betaine amphoteric surfactants are further preferable for a dispersion medium to which a fine-particle metal compound comprising calcium or magnesium is blended.

Of those betaine amphoteric surfactants, alkylene oxide adduct betaine amphoteric surfactants are more preferable, because their hydrophilic and hydrophobic property can be designed comparatively easily in order to make them improve the stability of oil globules comprising a polymerizable component and blowing agent in an aqueous dispersion medium and adsorb onto the oil globules for the purpose of preventing permeation of a blowing agent through the shell of microspheres.

The amount of the amphoteric surfactant blended in a dispersion medium is determined according to an intended size of resultant heat-expandable microspheres. The amount of the amphoteric surfactant is not specifically restricted, and preferably ranges from 0.0001 to 5 parts by weight, more preferably from 0.0003 to 2 parts by weight, to 100 parts by weight of a polymerizable component. An amount of the amphoteric surfactant less than 0.0001 parts by weight to 100 parts by weight of a polymerizable component can result in unstable dispersion of oil globules comprising a polymerizable component and blowing agent in a dispersion medium and disturb stable production of heat-expandable microspheres. On the other hand, an amount of the amphoteric surfactant more than 5 parts by weight to 100 parts by weight of a polymerizable component is not economical.

The amount of the amphoteric surfactant preferably ranges from 0.001 to 40 parts by weight, more preferably from 0.005 to 10 parts by weight, to 100 parts by weight of a fine-particle metal compound. An amount of the amphoteric surfactant less than 0.001 parts by weight to 100 parts by weight of a fine-particle metal compound can result in unstable dispersion of oil globules comprising a polymerizable component and blowing agent in an aqueous dispersion medium and disturb stable production of a heat-expandable microsphere. On the other hand, an amount of the amphoteric surfactant more than 40 parts by weight to 100 parts by weight of a fine-particle metal compound is not economical.

Dispersion-stabilizing auxiliaries other than the amphoteric surfactants can also be employed in the present invention. Those auxiliaries include emulsifiers, such as a condensate of diethanol amine and an aliphatic dicarboxylic acid, condensate of urea and formaldehyde, polyethylene oxide, methyl cellulose, polyvinyl alcohol, polyvinyl pirrolidone, sorbitan ester, sodium laurylsulfate and sodium dodecylbenzene sulfonate.

The weight ratio of an amphoteric surfactant in the dispersion-stabilizing auxiliaries is not specifically limited, and preferably ranges from 40 to 100 wt % and more preferably from 50 to 100 wt %. A weight ratio of the amphoteric surfactant less than 40 wt % can decrease the encapsulation efficiency of a blowing agent encapsulated in heat-expandable microspheres and cause poor heat-expansion performance of the resultant heat-expandable microspheres.

In the process of the present invention, high encapsulation efficiency of a blowing agent is achieved owing to a fine-particle metal compound and amphoteric surfactant contained in the aqueous dispersion medium. In other words, the fine-particle metal compound and amphoteric surfactant decrease the waste of a blowing agent charged in the process and make the blowing agent efficiently encapsulated in heat-expandable microspheres.

The aqueous dispersion medium can further include an electrolyte. The electrolyte is not specifically restricted, and includes sodium chloride, magnesium chloride, calcium chloride, sodium sulfate, magnesium sulfate, ammonium sulfate and sodium carbonate. One of or combination of at least two of those electrolyte can be employed. The amount of the electrolyte is not specifically restricted, and preferably ranges from 0.1 to 50 parts by weight to 100 parts by weight of water in the aqueous dispersion medium.

The aqueous dispersion medium can further contain a water-soluble compound as a polymerization auxiliary. The water-soluble compound includes, for example, water-soluble 1,1-substituted compounds having a carbon atom bonded with a hydrophilic functional group selected from a group consisting of hydroxyl group, carboxylate (salt) group and phosphonate (salt) group and a hetero atom; potassium dichromate; alkali metal nitrite salts; metal (III) halides; boric acid; water-soluble ascorbic acids; water-soluble polyphenols; water-soluble vitamin Bs; water-soluble phosphonates (salts); oxygen-comprising aluminum salts and/or their hydrates; polyalkylene imines having a molecular weight at least 1000 and having at least one nitrogen atom bonded with an alkyl group substituted with a hydrophilic functional group selected from a group consisting of carboxylate (salt) group and phosphonate (salt) group. The term "water-soluble" herein means a property of a substance soluble by at least 1 g in 100 g of water at 25° C.

The amount of the water-soluble compound contained in the aqueous dispersion medium is not specifically restricted, and preferably range from 0.0001 to 1.0 part by weight, more preferably from 0.001 to 0.07 parts by weight, to 100 parts by weight of a polymerizable component.

An aqueous dispersion medium comprising a fine-particle metal compound and amphoteric surfactant can be prepared by, for example, blending an amphoteric surfactant to a colloid of a fine-particle metal compound mentioned above while the colloid is prepared, or blending a water-soluble aqueous dispersion medium comprising a fine-particle metal compound previously prepared and an amphoteric surfactant.

The polymerization step of the present invention employs a neutral or basic aqueous dispersion medium. The pH of the aqueous dispersion medium can vary depending of the variant of a fine-particle metal compound used, and can be within a range in which the fine-particle metal compound is dispersed in water-insoluble or hardly water-soluble state.

Generally, the pH of the aqueous dispersion medium preferably ranges from 7 to 12, more preferably from 8 to 11.8, further preferably from 9 to 11.5 and most preferably from 9.5 to 11. In an aqueous dispersion medium having a pH of less than 7, a fine-particle metal compound in the aqueous dispersion medium dissolves to lose its effect of dispersion stabilizer, and oil globules comprising a polymerizable component and blowing agent cannot sometimes be dispersed stably in the aqueous dispersion medium and cannot sometimes be processed into a heat-expandable microsphere. On the other hand, an aqueous dispersion medium having a pH of greater than 12 can cause hydrolysis of the shell of heat-expandable microspheres leading to permeation of gasified blowing agent through the shell and resulting in low encapsulation efficiency of the blowing agent and poor heat-expansion ratio of resultant heat-expandable microspheres. Such deterioration in the properties of heat-expandable microspheres can sometimes be accelerated by a nitrile monomer, which is a polymerizable component functioning to achieve high heat and solvent resistance of heat-expandable microspheres.

A preferable pH for the aqueous dispersion medium can depend on the variant of the metal compound. For example, fine-particle magnesium hydroxide becomes insoluble and starts to disperse in an aqueous dispersion medium having a pH greater than 9.0 or 9.5. In this case, the pH of the aqueous dispersion medium should preferably range from 9 to 12, more preferably from 9.5 to 11.5, further more preferably from 10 to 11, and most preferably from 10.2 to 10.5. Fine-particle calcium phosphate disperses uniformly in an aqueous dispersion medium having a pH greater than about 7 to function as a dispersion stabilizer. Thus, the pH of the aqueous dispersion medium should preferably range from 7 to 12, more preferably from 8 to 11 and most preferably from 9 to 10.5.

The process of the present invention includes the steps of mixing a polymerizable component comprising essentially a monomer and optionally comprising a cross-linking agent, a blowing agent, an aqueous dispersion medium comprising essentially water, a fine-particle metal compound functioning as a dispersion stabilizer and an amphoteric surfactant functioning as a dispersion-stabilizing auxiliary and optionally comprising another dispersion-stabilizing auxiliary, a water-soluble compound and an electrolyte, and a polymerization initiator; and polymerizing the polymerizable component. The order of mixing those components is not specifically restricted, and components soluble or dispersible in the aqueous dispersion medium can be blended before other components are blended.

In the process of the present invention, oil globules comprising a polymerizable monomer and blowing agent are dispersed and emulsified in an aqueous medium in order to make oil globules of a prescribed particle size.

The methods for dispersing and emulsifying the oily mixture include generally known dispersion techniques, such as agitation with a Homo-mixer (for example, a device produced by Tokushu Kika Kogyou) or Homo-disper (for example, a device produced by Tokushu Kika Kogyou), dispersion with a static dispersing apparatus such as a Static mixer (for example, a device produced by Noritake Engineering Co., Ltd.), membrane emulsification technique, ultrasonic dispersion, and mixing in microchannels.

Then suspension polymerization is started by heating the dispersion in which the oily mixture is dispersed into oil globules in the aqueous dispersion medium. The dispersion should preferably be agitated during the polymerization reaction gently to prevent the floating of monomers and sedimentation of polymerized heat-expandable microspheres.

The polymerization temperature can be settled optionally according to the variant of a polymerization initiator, and should preferably be controlled within the range from 30 to 100° C., more preferably from 40 to 90° C. and further more preferably from 50 to 85° C. The polymerization temperature should preferably be maintained for about 0.1 to 20 hours. The initial pressure for the polymerization is not specifically restricted, and should preferably be controlled within the range from 0 to 5.0 MPa, more preferably from 0.1 to 3.0 MPa and most preferably from 0.2 to 2.0 MPa in gauge pressure.

The aqueous dispersion medium comprising heat-expandable microspheres after the polymerization step (hereinafter sometimes referred to as a polymerization liquid) sometimes contains byproducts such as agglomeration of heat-expandable microspheres and residue from polymerization. Such byproducts are usually larger than the particle size of the heat-expandable microspheres and do not pass a sieve of a certain mesh size or smaller. The ratio of heat-expandable microspheres passing a sieve indicates the stability of producing heat-expandable microspheres and is useful for evaluating the production stability of heat-expandable microspheres. The ratio of heat-expandable microspheres representing the production stability should preferably be at least 50 wt %, more preferably at least 70 wt %, further more preferably at least 80 wt %, and most preferably at least 90 wt %. A ratio of heat-expandable microspheres representing the production stability less than 50 wt % indicates that the production process contains troubles and heat-expandable microspheres are not produced efficiently. The definition of the production stability of heat-expandable microspheres will be described in detail in Examples.

Heat-expandable microspheres are separated from a polymerization liquid through suction filtration, pressure filtration or centrifugal separation into a wet cake of the heat-expandable microspheres. Then the heat-expandable microspheres can be subjected to the pH decreasing step and washing step described below.

pH-decreasing Step

The pH of the heat-expandable microspheres produced in the polymerization step mentioned above is decreased in the pH-decreasing step. In the pH-decreasing step, the fine-particle metal compound covering the surface of the heat-expandable microspheres produced in the polymerization step is easily dissolved and removed, and clean heat-expandable microspheres are produced.

The procedure for pH decreasing treatment is not specifically restricted, and any procedure of decreasing the pH of polymerized heat-expandable microspheres by contacting an acidic substance to the heat-expandable microspheres is employable. The acidic substance is not specifically restricted, and includes, for example, inorganic acids such as hydrochloric acid (hydrogen chloride), sulfuric acid, nitric acid and perchloric acid; and organic acids such as carboxylic acids including acetic acid and butyric acid.

The pH of heat-expandable microspheres can be decreased by, for example, 1) mixing a polymerization liquid with an acidic substance or 2) mixing heat-expandable microspheres separated from a polymerization liquid with an acidic substance. Heat-expandable microspheres separated from a polymerization liquid can be mixed with an acidic substance in the presence of an extra amount of water.

The pH of a liquid comprising heat-expandable microspheres and an acidic substance should preferably be not more than 8, more preferably not more than 6. A pH of the liquid more than 8 can cause difficulty in completely removing a fine-particle metal compound from the surface of heat-expandable microspheres.

Heat-expandable microspheres after the pH decreasing treatment are separated from the liquid in the same manner as mentioned above, and a wet cake of the heat-expandable microspheres is obtained.

Washing Step

Heat-expandable microspheres after the polymerization step or the pH decreasing step are cleaned by washing with water (hereinafter referred to as washing step) to completely remove a fine-particle metal compound. Heat-expandable microspheres after the pH-decreasing step are washed into cleaner heat-expandable microspheres.

Heat-expandable microspheres are washed by contacting a wet cake of heat-expandable microspheres and water at least once. The water for the washing includes, for example, tap water, deionized water, distilled water and ultra-pure water.

The methods for the water washing include, for example, 1) Process A in which a wet cake of heat-expandable microspheres is washed with water when the heat-expandable microspheres are separated by suction filtration, pressure filtration or centrifugal separation; and 2) Process B in which heat-expandable microspheres or a wet cake of heat-expandable microspheres is re-dispersed in new water and washed.

In Process A, for example, a wet cake of heat-expandable microspheres is showered. In Process B, heat-expandable microspheres are sufficiently washed by one-time re-dispersion in water, and repeated washing achieves better effect.

The amount of water used for the washing step is not specifically restricted, and should preferably be at least 100 parts by weight, more preferably at least 200 parts by weight, to 100 parts by weight of heat-expandable microspheres for effective washing. An amount of the water less than 100 parts by weight can lead to insufficient washing.

The temperature of water used for the washing step is not specifically restricted, and should preferably range from 2 to 80° C., more preferably from 20 to 70° C., and most preferably from 30 to 60° C. for effective washing. A temperature of water lower than 2° C. results in poor effect in washing. On the other hand, a water temperature higher than 80° C. results in decreased expansion performance or slight expansion of heat-expandable microspheres.

Heat-expandable microspheres after the washing step are separated in the same manner as described above to be formed into a wet cake. The resultant heat-expandable microspheres (usually a wet cake of heat-expandable microspheres) are dried in an oven, reduced-pressure drier, flash drier or nauta mixer to be prepared into dry heat-expandable microspheres.

Heat-expandable Microspheres

The heat-expandable microspheres of the present invention are described below. One of the heat-expandable microspheres, as shown in FIG. 1, has a structure consisting of 11 an outer wall of a thermoplastic resin (shell) and 12 a blowing agent (core) encapsulated in the shell and vaporizable at a temperature lower than the softening point of the thermoplastic resin. The whole of the heat-expandable microsphere is thermally expandable (the whole of the microsphere expands by heating). The thermoplastic resin, polymerizable component polymerized into the thermoplastic resin, and blowing agent are the same as mentioned above.

The mean particle size of the heat-expandable microspheres is not specifically restricted, and can be optionally designed according to the use of the microspheres. The mean particle size preferably ranges from 1 to 100 μm, more preferably from 3 to 60 μm, and most preferably from 5 to 50 μm.

The coefficient of variation (CV) of the particle size distribution of the heat-expandable microspheres is not specifically restricted, and should preferably be not more than 35%, more preferably not more than 30%, and most preferably not more than 25%. The coefficient of variation, CV, can be calculated by the following mathematical expressions (1) and (2).

[Math. 1]

$$CV = (s/\langle x \rangle) \times 100 (\%) \qquad (1)$$

$$s = \left[\sum_{i=1}^{n}(xi-\langle x\rangle)^2/(n-1)\right]^{1/2} \quad (2)$$

(where s is a standard deviation of the particle size of the microspheres, <x> is a mean particle size of the microspheres, "xi" is the particle size of the i-th particle, and n represents the number of particles)

The encapsulation ratio of a blowing agent is defined to be the percentage of the weight of the blowing agent encapsulated in heat-expandable microspheres to the weight of the heat-expandable microspheres. The encapsulation ratio of a blowing agent is not specifically restricted, and is optionally determined according to the use of resultant heat-expandable microspheres. The encapsulation ratio should preferably range from 5 to 35%, more preferably from 10 to 30%, and most preferably from 15 to 25%. An encapsulation ratio of a blowing agent of less than 5% can leads to insufficient effect by the blowing agent. On the other hand, an encapsulation ratio of a blowing agent of more than 35% can result in thin shell of heat-expandable microspheres through which the blowing agent permeates, and consequently decrease the heat resistance and expansion performance of the microspheres.

The encapsulation efficiency of a blowing agent in heat-expandable microspheres means the weight ratio of a blowing agent encapsulated in heat-expandable microspheres to the whole of the blowing agent charged in the polymerization step of the process of the present invention. The encapsulation efficiency of a blowing agent indicates the efficiency in encapsulating a blowing agent into heat-expandable microspheres in the process of the present invention.

The encapsulation efficiency of a blowing agent in heat-expandable microspheres is not specifically restricted, and should preferably range from 90 to 100%, more preferably from 95 to 100%, and most preferably from 97 to 100%. An encapsulation efficiency lower than 90% can deteriorate the expansion performance of resultant heat-expandable microspheres.

The expansion-initiation temperature ($T_s$) of the heat-expandable microspheres is not specifically restricted, and should preferably range from 60 to 250° C., more preferably from 70 to 230° C., further more preferably from 80 to 200° C., yet further more preferably from 90° C. to 180° C., and most preferably from 100° C. to 160° C. Heat-expandable microspheres having an expansion-initiation temperature lower than 60° C. can be poorly stable during storage, and may not be suitable for blending with paint or resin compositions.

The maximum expansion temperature ($T_{max}$) of the heat-expandable microspheres is not specifically restricted, and should preferably range from 80 to 300° C., more preferably from 90 to 280° C., further more preferably from 100 to 250° C., yet further more preferably from 110° C. to 230° C., and most preferably from 120° C. to 210° C. Heat-expandable microspheres having a maximum expansion temperature lower than 80° C. may not be suitable for blending with paint or resin compositions.

A blowing agent encapsulated in heat-expandable microspheres generally escapes outside while the heat-expandable microspheres are heated and expanded. High amount of a blowing agent escaping outside results in poor expansion of the heat-expandable microspheres to inhibit the reduction of the weight of compositions and formed articles mentioned below and adversely affect their properties. In the present invention, the percentage of the encapsulation ratio of a blowing agent in heat-expandable microspheres at a heat-expansion temperature (T) to the encapsulation ratio of the blowing agent in the heat-expandable microspheres before heat expansion is defined as the retention ratio of the blowing agent in the heat-expandable microspheres at the heat-expansion temperature (T). In the present invention, the temperature, T, is defined to be the average temperature ($T_{av}$) of the expansion-initiation temperature ($T_s$) and the maximum expansion temperature ($T_{max}$) of heat-expandable microspheres, and is utilized as a measure for determining the ratio of a blowing agent retained in heat-expandable microspheres without escaping and for evaluating the expansion performance of heat-expandable microspheres including heat resistance and heat expansion. The retention ratio of a blowing agent in heat-expandable microspheres at an average temperature ($T_{av}$) should preferably be at least 70%, more preferably at least 73%, further more preferably at least 75%, yet further more preferably at least 80%, and most preferably at least 85%. A retention ratio lower than 70% mean that a gasified blowing agent easily escapes out of heat-expandable microspheres to deteriorate the heat resistance and expansion performance of the heat-expandable microspheres. Such heat-expandable microspheres inhibit the reduction of the weight of the compositions and formed articles mentioned below and adversely affect their properties.

The ratio of silicon contained in the heat-expandable microspheres should be not more than 500 ppm, preferably not more than 400 ppm, more preferably not more than 300 ppm, further preferably not more than 150 ppm, and most preferably not more than 100 ppm. A ratio of silicon more than 500 ppm in heat-expandable microspheres inhibits the reduction of the weight of the compositions or formed articles comprising the heat-expandable microspheres or the microballoons mentioned below and adversely affects their properties.

The ratio of aluminum contained in heat-expandable microspheres should be usually not more than 350 ppm, preferably not more than 300 ppm, more preferably not more than 250 ppm, further more preferably not more than 200 ppm, and most preferably not more than 100 ppm. A ratio of aluminum more than 350 ppm in heat-expandable microspheres inhibits the reduction of the weight of the composition or formed articles comprising the heat-expandable microspheres or the microballoons described below, and adversely affects their properties.

The ratio of the sum of silicone and aluminum contained in the heat-expandable microspheres should be not more than 600 ppm, preferably not more than 500 ppm, more preferably not more than 400 ppm, further more preferably not more than 300 ppm, and most preferably not more than 200 ppm. A ratio of the sum of silicon and aluminum more than 600 ppm in heat-expandable microspheres inhibits the reduction of the weight of the compositions or formed articles comprising the heat-expandable microspheres or the microballoons mentioned below, and adversely affects their properties.

The ratio of magnesium contained in the heat-expandable microspheres should be within the following ranges 1) to 7), and a former range is better than a latter:

1) not more than 20000 ppm, 2) not more than 10000 ppm, 3) not more than 3000 ppm, 4) not more than 1000 ppm, 5) not more than 300 ppm, 6) not more than 100 ppm, or 7) not more than 50 ppm.

A ratio of magnesium more than 20000 ppm in heat-expandable microspheres can inhibit the reduction of the weight of the compositions or formed articles comprising the heat-expandable microspheres or the microballoons mentioned below, and adversely affect their properties.

The ratio of the sum of silicone and magnesium contained in heat-expandable microspheres should be within the following ranges 1) to 7), and a former range is better than a latter:

1) not more than 20000 ppm, 2) not more than 10000 ppm, 3) not more than 3000 ppm, 4) not more than 1000 ppm, 5) not more than 400 ppm, 6) not more than 200 ppm, or 7) not more than 100 ppm.

A ratio of the sum of silicon and magnesium more than 20000 ppm in heat-expandable microspheres can inhibit the reduction of the weight of the compositions or formed articles comprising the heat-expandable microspheres or the microballoons mentioned below, and adversely affect their properties.

The ratio of ash contained in the heat-expandable microspheres should preferably be not more than 3 wt %, more preferably not more than 2 wt %, further preferably not more than 1 wt %, and most preferably not more than 0.5 wt %. A ratio of ash more than 3 wt % in heat-expandable microspheres inhibits the reduction of the weight of the compositions or formed articles comprising the heat-expandable microspheres or the microballoons mentioned below, and adversely affects their properties. The ash contained in heat-expandable microspheres is estimated to be derived from colloidal silica and a metal compound.

The process for producing heat-expandable microspheres of the present invention is not specifically restricted, and comprises the process mentioned above, and a similar process in which colloidal silica is employed as a dispersion stabilizer in polymerization in acidic dispersion medium and silicon contained in heat-expandable microspheres is removed in an alkaline liquid.

Microballoons

The microballoons of the present invention are produced by heating and expanding the heat-expandable microspheres mentioned above and/or heat-expandable microspheres produced in the production process mentioned above.

The microballoons of the present invention are lightweight and improve the properties of compositions or formed articles comprising the microballoons. Especially, an adhesive composition comprising the microballoons has excellent properties after curing to exhibit low hardness and high elongation.

The process for producing the microballoons includes dry heat-expansion methods and wet heat-expansion methods. The heat-expansion temperature preferably ranges from 80° C. to 350° C.

The mean particle size of the microballoons is not specifically restricted, and can be optionally designed according to the application of the microballoons. The mean particle size should preferably range from 0.1 to 1000 µm, and more preferably from 0.8 to 200 µm. The coefficient of variation, CV, of the particle size distribution of the microballoons is not specifically restricted, and should preferably be not more than 30%, and more preferably not more than 25%.

The true specific gravity of the microballoons is not specifically restricted, and should preferably range from 0.010 to 0.5, more preferably from 0.015 to 0.3 and most preferably from 0.020 to 0.2.

Figure 2:
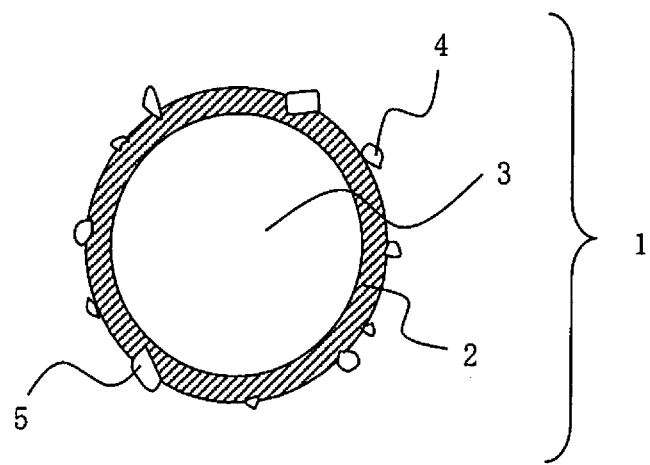
FIG. 2: Schematic diagram illustrating a microballoon of the present invention

A microballoon (1) can contain fine particles (4 or 5) coating the outer surface of its shell (2) as shown in FIG. 2, and is hereinafter sometimes referred to as a fine-particle-coated microballoon.

The coating mentioned here mean that the particulate filler (4 or 5) is in a state of adhesion (4) on the shell (2) of a fine-particle-coated microballoon (1), or in a state of fixation in a dent (5) of the shell of the microballoon as the result of the particulate filler pushing into the thermoplastic shell melted with heat. The particle shape of the particulate filler can be irregular or spherical. The fine-particle-coated microballoons have improved handling property.

The mean particle size of the fine particles is not specifically restricted, and selected depending on microballoons to be coated. The mean particle size of the fine particles should preferably range from 0.001 to 30 µm, more preferably from 0.005 to 25 µm, and further more preferably from 0.01 to 20 µm.

Fine particles of various materials including both inorganic and organic materials can be employed for the fine particles. The shape of the fine particles includes spherical, needle-like and plate-like shapes.

A useful adhesive composition is formulated by blending the fine-particle-coated microballoons with a composition mentioned below.

The fine-particle-coated microballoons can be produced by, for example, heating and expanding heat-expandable microspheres coated with fine particles. A preferable process for producing fine-particle-coated microballoons includes a step of mixing heat-expandable microspheres and fine particles (mixing step), and heating the mixture prepared in the mixing step at a temperature higher than the softening point of the thermoplastic resin to expand the heat-expandable microspheres and adhering the fine particles on the outer surface of the resultant microballoons (coating step).

The true specific gravity of the fine-particle-coated microballoons is not specifically restricted, and should preferably range from 0.01 to 0.5, more preferably from 0.03 to 0.4, further more preferably from 0.05 to 0.35, and most preferably from 0.07 to 0.30. Fine-particle-coated microballoons having a true specific gravity smaller than 0.01 may have insufficient durability. On the other hand, fine-particle-coated microballoons having a true specific gravity more than 0.5 is uneconomical, because such microballoons have insufficient performance for decreasing the specific gravity of a composition, and a considerable amount of such microballoons are required for preparing a lightweight composition.

The moisture content of the microballoons is not specifically restricted, but should preferably not more than 0.5 wt %, more preferably not more than 0.4 wt %, further more preferably not more than 0.35 wt %, and most preferably not more than 0.3 wt %. The minimum moisture content of the microballoons is 0 wt %. The moisture in the microballoons exists in a state like crystallization water. The moisture continues to adhere onto the surface of microballoons after the microballoons are added in a composition (especially an adhesive composition) mentioned below, and does not disperse uniformly in the composition. Such moisture accelerates localized curing of the adhesive composition. Thus microballoons comprising moisture more than 0.5 wt % results in a nonuniformly cured adhesive composition that exhibits high hardness and low elongation after curing.

The moisture in microballoons is estimated to be derived from a dispersion stabilizer used for producing heat-expandable microspheres. Such dispersion stabilizer is usually a hygroscopic inorganic compound, and a dispersion stabilizer remaining on produced heat-expandable microspheres results in high moisture content of resultant microballoons. High moisture content of microballoons facilitates localized curing of an adhesive composition comprising such microballoons.

On the contrary, the microballoons of the present invention produced of the heat-expandable microspheres of the present invention contain low ratios of silicon and aluminum and low total ratio of silicon and aluminum to contain low amount of hygroscopic inorganic compounds. Thus, the microballoons contain low amount of moisture and contribute to stable manufacture of adhesive compositions having high performance and good properties.

Compositions and Formed Articles

The composition of the present invention comprises at least one particles selected from the group consisting of the heat-expandable microspheres of the present invention, heat-expandable microspheres produced in the production process of the present invention, and microballoons of the present invention; and a base component. The base component is not specifically restricted, and includes, for example, rubbers;

thermosetting resins; thermoplastic resins; thermoplastic elastomers; bioplastics; sealant materials, such as modified silicones, polyurethanes, polysulfides, acrylates, silicones, polyisobutylenes and butyl rubber; paint components; and inorganic materials, such as cement.

The composition of the present invention can be prepared by mixing the base component, heat-expandable microspheres and/or microballoons.

The application of the composition of the present invention includes, for example, molding compositions, paint compositions, clay compositions, fiber compositions, adhesive compositions, and powder compositions.

The components of an adhesive composition of the present invention are not specifically restricted, and any base components that can adhere objects (hereinafter referred to as adhesive components) are employed. Such adhesive components include, for example, one-component polyurethane adhesive, two-component polyurethane adhesive, one-component modified silicone adhesive, two-component modified silicone adhesive, one-component polysulfide adhesive, two-component polysulfide adhesive and acrylic adhesive. The adhesive component should preferably be at least one selected from the group consisting of one-component polyurethane adhesive, two-component polyurethane adhesive, one-component modified silicone adhesive and two-component modified silicone adhesive, and more preferably at least one selected from the group consisting of two-component polyurethane adhesive and two-component modified silicone adhesive.

The weight ratio of an adhesive component and microballoons (adhesive to microballoon ratio) blended into an adhesive composition is not specifically restricted, and should preferably range from 99.995:0.005 to 70:30, and more preferably from 99.95:0.05 to 90:10. High adhesive to microballoon ratio, i.e., low ratio of microballoons, decreases the lightweight effect by the microballoons. On the other hand, low adhesive to microballoon ratio, i.e., low ratio of adhesive, can lead to insufficient function of an adhesive composition.

The formed articles of the present invention are manufactured by forming the compositions of the present invention. The formed articles of the present invention include, for example, formed products, coating film, and cured adhesive compositions. The formed articles of the present invention have improved properties including lightweight, porosity, sound absorbency, thermal insulation, low heat conduction, low dielectric property, design, and shock absorbency.

The cured adhesive composition of the present invention should preferably have lower hardness and higher elongation.

EXAMPLES

The present invention will be specifically described with the following Examples and Comparative examples, though the present invention is not restricted within the scope of those Examples and Comparative examples. In the following Examples and Comparative examples, "part(s)" means "part(s) by weight" unless otherwise specified.

The properties of the heat-expandable microspheres produced in the following Examples and Comparative examples were determined in the methods described below.

pH

The pH values of the heat-expandable microspheres were determined with a pH meter (HM-12P, manufactured by DKK-Toa Corporation).

Mean Particle Size and Particle Size Distribution

Heat-expandable microspheres were analyzed in wet system of a laser diffraction particle size analyzer (HEROS & RODOS, manufactured by SYMPATEC), and the mean volume diameter $D_{50}$ determined in the analysis was defined as a mean particle size.

Encapsulation Ratio of a Blowing Agent

The moisture content, $C_w$ (%), of heat-expandable microspheres after drying was determined with a Karl Fischer moisture meter (MKA-510N, manufactured by Kyoto Electronics Manufacturing Co., Ltd.). One gram of heat-expandable microspheres after drying was placed in a stainless steel evaporating dish (15 mm deep and 80 mm in diameter), and weighed out ($W_3$) (%). Then 30 mL of acetonitrile was added to disperse the microspheres uniformly. After being left for 2 hours at room temperature, the microspheres were dried at 110° C. for 2 hours, and the dry weight ($W_4$) (%) was determined. The encapsulation ratio of the blowing agent, $CR_2$ (wt %), was calculated by the following mathematical expression (A).

$$CR_2 = ((W_3 - W_4)/1.0) \times 100 - C_w \quad (A)$$

Encapsulation efficiency of a blowing agent in heat-expandable microspheres

The encapsulation efficiency of a blowing agent, $C_e$ (%), in heat-expandable microspheres was calculated by the following mathematical expression (B) from the theoretical encapsulation ratio of the blowing agent, $CR_1$ (wt %), and the encapsulation ratio of the blowing agent, $CR_2$ (wt %), calculated by the mathematical expression (A) mentioned above.

$$C_e (\text{wt \%}) = (CR_1/CR_2) \times 100 \quad (B)$$

The theoretical encapsulation ratio of a blowing agent, $CR_1$, was calculated by the following mathematical expression (C) from the weight of the blowing agent, $W_1$ (g), and the weight of an oily mixture, $W_2$ (g), both of which were charged in the polymerization step.

$$CR_1 = (W_1/W_2) \times 100 \quad (C)$$

An encapsulation efficiency of a blowing agent in heat-expandable microspheres, $C_e$, of 90 wt % or greater was evaluated to be acceptable (○), while an encapsulation efficiency smaller than 90 wt % was evaluated to be unacceptable (×).

Evaluation of Production Stability

An aqueous dispersion medium comprising polymerized heat-expandable microspheres was prepared in an amount of $W_6$ (g) and sifted with a metal sieve (200 μm mesh, manufactured by Kansai Wire Netting Co., Ltd.). The weight of the aqueous dispersion medium passing the sieve, $W_5$ (g), was measured. The ratio of the aqueous dispersion medium passing the sieve, Y (wt %), was calculated from $W_5$ (g) and $W_6$ (g) by the following mathematical expression (D).

$$Y(\text{wt \%}) = (W_5/W_6) \times 100 \tag{D}$$

The ratio, Y (wt %), was evaluated according to the criteria shown below.

×: Y<50 wt %
Δ: 50 wt %≤Y<90 wt %
○: Y≥90 wt %

Expansion Ratio of Heat-expandable Microspheres

Dried heat-expandable microspheres and an EVA adhesive were mixed in a ratio of 1:9 (solid ratio). The resultant mixture was spread on high-quality paper about 0.2 mm thick and dried at room temperature. Then the thickness of the dried film, $D_1$ (mm), was measured. The coated paper was heated in an oven at the temperatures, 170° C., 180° C. and 190° C., each for 2 min. Then the thickness of each heated film, $D_2$ (mm), was measured. The expansion ratio, $R_{ex}$, was calculated from $D_1$ (mm) and $D_2$ (mm) by the following mathematical expression (E).

$$R_{ex} = D_2/D_1 \tag{E}$$

Ash in Heat-expandable Microspheres

Dried heat-expandable microspheres were placed in a crucible in an amount of $W_p$ (g) and heated with an electric heater at 700° C. for 30 min to be ignited into ash. The weight of the resultant ash $W_q$ (g) was measured. The ash in the heat-expandable microspheres, $C_A$ (wt %), was calculated from $W_p$ (g) and $W_q$ (g) by the following mathematical expression (F).

$$C_A(\text{wt \%}) = W_q/W_p \times 100 \tag{F}$$

Determination of expansion-initiation temperature ($T_s$) and maximum expansion temperature ($T_{max}$) of heat-expandable microspheres Those temperatures were determined with a DMA (DMA Q800, manufactured by TA Instruments). In an aluminum cup 4.8 mm deep and 6.0 mm in diameter (5.65 mm in inside diameter), 0.5 mg of heat-expandable microspheres were placed, and the cup was covered with an aluminum cap 0.1 mm thick and 5.6 mm in diameter to prepare a sample. The sample was subjected to the pressure of 0.01 N with the compression unit of the device, and the height of the sample was measured. The sample was then heated at temperatures elevating at a rate of 10° C./min in the temperature range from 20 to 300° C., being subjected to the pressure of 0.01 N with the compression unit, and the vertical change of the position of the compression unit was measured. The temperature at which the compression unit started to change its position to the positive direction was determined as the expansion-initiation temperature ($T_s$), and the temperature at which the compression unit indicated the greatest change was determined as the maximum expansion temperature ($T_{max}$). The average of $T_s$ and $T_{max}$ was calculated and define to be $T_{av}$.

Retention Ratio of a Blowing Agent in Heat-expandable Microspheres at $T_{av}$

The retention ratio of a blowing agent at $T_{av}$ was determined with a TG-DTA (a differential thermogravimetric analyzer TG8120, manufactured by Rigaku Corporation). In an aluminum pan having an outer diameter of 5.2 mm, $W_r$ g of heat-expandable microspheres were placed and heated at temperatures elevating at a rate of 10° C./min in the temperature range from 20 to 80° C., and then heated at 80° C. for 30 min to a constant weight to remove the moisture contained. Then the temperature was elevated from 80° C. to 300° C. at a rate of 10° C./min to determine the weight of the heat-expandable microspheres at $T_{av}$° C., $W_s$ (g).

The amount of the blowing agent released from heat-expandable microspheres, $CR_3$ (wt %), was calculated by the following mathematical expression (G) and the retention ratio of the blowing agent in heat-expandable microspheres, $R_h$ (%), was calculated by the following mathematical expression (H).

The retention ratio of the blowing agent, $R_h$ (%), was evaluated by the following criteria.

$$((W_r - W_s)/W_r \times 100) - C_W = CR_3 \tag{G}$$

$$R_h = (CR_2 - CR_3)/CR_2 \tag{H}$$

×: $R_h$<70%
○: $R_h$≥70%

Ratio of Silicon Contained in Heat-expandable Microspheres

An alkaline digestion solution was prepared by dissolving potassium hydroxide in a uniform mixture of ethanol and water mixed in a ratio of 95:5. Ten milliliters of the alkaline digestion solution was added to 1.0 g of heat-expandable microspheres and the mixture was heated with an electric heater at 380° C. for at least 30 min. Then the heated mixture was ignited to be carbonized and incinerated in an electric furnace. To the incinerated matter, 0.5 g of a reagent prepared by mixing sodium carbonate and potassium carbonate in an equal quantity was added. The mixture was then melted and cooled, and ultrapure water was added to make 50 mL of a sample. The amount of silicone in the sample was measured with an ICP optical emission spectrometer (ICP-8100, manufactured by Shimadzu Corporation). The result was calculated into the ratio of silicon contained in the heat-expandable microspheres.

Ratios of Aluminum and Magnesium Contained in Heat-expandable Microspheres

Ten milliliters of N,N-dimethylformamide was added to 1.0 g of heat-expandable microspheres to dissolve the microspheres, and the solution was carbonized with an electric heater. To the carbonized matter, 4 mL of sulfuric acid (a reagent for toxic metal analysis) was added and acid digestion was performed with an electric heater. The digested matter was then incinerated in an electric furnace at 500 to 780° C. and cooled, and 0.5 mL of nitric acid (a reagent for toxic metal analysis) and ultrapure water were added to make 50 mL of a sample. The ratios of aluminum and magnesium in the sample were measured and calculated in the same manner for calculation the ratio of silicon as mentioned above.

True Specific Gravity of Microballoons

The true specific gravity of microballoons was determined in the liquid substitution method (Archimedean method) with isopropyl alcohol in an atmosphere at 25° C. and 50% RH (relative humidity) as described below.

Specifically, an empty 100-mL measuring flask was dried and weighed ($WB_1$). Then isopropyl alcohol was poured into the weighed measuring flask to accurately form meniscus, and the measuring flask filled with isopropyl alcohol was weighed ($WB_2$). The 100-mL measuring flask was then emptied, dried, and weighed ($WS_1$). The weighed measuring flask was then filled with about 50 mL of microballoons, and the measuring flask filled with the microballoons was weighed ($WS_2$). Then isopropyl alcohol was poured into the measuring flask filled with the microballoons to accurately form meniscus without taking bubbles into the isopropyl alcohol, and the flask filled with the microballoons and isopropyl alcohol was weighed ($WS_3$). The values, $WB_1$, $WB_2$, $WS_1$, $WS_2$, and $WS_3$, were introduced into the following mathematical expression to calculate the true specific gravity (d) of the microballoons.

$$d=[(WS_2-WS_1)\times(WB_2-WB_1)/100]/[(WB_2-WB_1)-(WS_3-WS_2)]$$

Sample of Cured Adhesive Composition

An adhesive composition was formed into a film 10 mm wide, 60 mm long and 3 mm thick. Then the film was aged at 23° C. and 50% RH for 14 days and further aged at 30° C. and 50% RH for 14 days to be made into a sample of cured adhesive composition.

Tensile Test for Cured Adhesive Composition

The tensile property of the sample was tested with a Tension tester (UTM-III-100, Manufactured by Toyo Baldwin Corporation). The sample was held by the two grips of the tester at each end to pull a 10-mm long part of the sample between the grips. Then the sample was pulled at a speed of 50 mm/min with a 100-kgf load cell in a room conditioned at 23° C. to determine the hardness (indicated by the maximum load) and the elongation (indicated by the length of the sample at the maximum load).

The acceptability of the cured adhesive composition was determined by the hardness and elongation of the cured adhesive composition measured in the test, according to the following criteria.

For an adhesive composition comprising a two-component polyurethane adhesive, a hardness of 13.5 N or lower is acceptable, and a hardness higher than 13.5 N is unacceptable. For an adhesive composition comprising a two-component modified-silicone adhesive, a hardness of 13.0 N or lower is acceptable, and a hardness higher than 13.0 N is unacceptable.

For an adhesive composition comprising a two-component polyurethane adhesive, an elongation at least 115 mm is acceptable, and an elongation smaller than 115 mm is unacceptable. For an adhesive composition comprising a two-component modified-silicone adhesive, an elongation at least 100 mm is acceptable, and an elongation smaller than 100 mm is unacceptable.

An elongation less than 115 mm of an adhesive composition comprising a polyurethane adhesive or an elongation less than 100 mm of an adhesive composition comprising a modified-silicone adhesive indicates that the adhesive composition has lost its elasticity, one of the characteristic properties of adhesive compositions.

An adhesive composition exhibiting acceptable hardness and elongation is evaluated as ○, while an adhesive composition exhibiting unacceptable hardness and/or elongation is evaluated as ×.

Example 1

An aqueous dispersion medium comprising 12 parts of fine-particle magnesium hydroxide was prepared by adding 45 parts of magnesium chloride hexahydrate and 1 part of an aqueous solution comprising 2 wt % of N-lauryl-N,N-bis ((POE(2)) aminoacetic acid betaine to 850 parts of deionized water, and gradually dropping 32 parts of an aqueous solution comprising 50 wt % of sodium hydroxide to control the pH of the aqueous medium in a range from 9 to 10.5. The amount of water contained in the aqueous dispersion medium was 891 parts, and the aqueous dispersion media in the following Examples and Comparative examples were prepared to contain 891 parts of water. The fine-particle magnesium hydroxide formed a colloid in the aqueous dispersion medium.

An oily mixture was prepared by mixing and dissolving 170 parts of acrylonitrile, 70 parts of methacrylonitrile, 1 part of ethylene glycol dimethacrylate, 1.5 parts of 2,2-azobisbutylonitrile and 60 parts of isopentane.

The aqueous dispersion medium and the oily mixture prepared in the above procedure were agitated with a T.K. Homo-mixer Type 2.5 (manufactured by Primix Corporation) at 3500 rpm for 5 min to be prepared into a suspension. Then the suspension was transferred into a compressive reactor of 1.5-liter capacity, purged with nitrogen, and polymerized at 60° C. for 15 hours by agitating the suspension at 80 rpm and controlling the initial reaction pressure at 0.3 MPa to be made into an aqueous dispersion medium A comprising heat-expandable microspheres.

After the polymerization, an aqueous sulfuric solution comprising 66 wt % of sulfuric acid was added to the aqueous dispersion medium A to decrease the pH of the medium to 4. Then the aqueous dispersion medium A with decreased pH was filtered with suction to make a wet cake comprising 60 wt % of heat-expandable microspheres. The wet cake comprising 276 parts of heat-expandable microspheres was showered with 1000 parts of deionized water at 35° C., filtered and dried to make heat-expandable microspheres. The properties of the resultant heat-expandable microspheres are shown in Table 1.

A portion of the aqueous dispersion medium A (pH 9.5) comprising heat-expandable microspheres was washed and filtered, and the separated heat-expandable microspheres were dried. The microspheres were incinerated and the amount of ash in the microspheres was determined to be 2.75%. To another portion of the dispersion medium A, sulfuric acid aqueous solution (comprising 66 wt % of sulfuric acid) was gradually dropped to decrease the pH of the aqueous dispersion medium A. The aqueous dispersion medium A (pH 8.1) was washed and filtered, and the separated heat-expandable microspheres were dried. The microspheres were incinerated and the amount of ash in the microspheres was determined to be 1.17%. The pH of other two portions of the aqueous dispersion medium A was further decreased to 4 and 2, and the amount of ash in the heat-expandable microspheres produced by washing the two portions of the aqueous dispersion medium A was determined to be 0% in the same procedure mentioned above.

The ash in the heat-expandable microspheres is estimated to be mainly derived from the fine-particle magnesium hydroxide. Thus the result mentioned above indicates that the magnesium hydroxide, which is the metal compound, adhering on the surface of heat-expandable microspheres was removed by decreasing the pH (and by subsequent washing) of an aqueous dispersion medium after polymerization. Further, decreasing the pH of an aqueous dispersion medium A to 8 or lower contributed to more sufficient removal of magnesium hydroxide from the surface of heat-expandable microspheres.

Examples 2 to 11

In Examples 2 to 11, heat-expandable microspheres were produced by polymerization, pH decreasing and washing in the same manner as that in Example 1 except that the polymerization parameters including the variant and amount of the dispersion stabilizers and dispersion stabilizing auxiliaries were settled as shown in Table 1. The properties of the resultant heat-expandable microspheres were tested and the results are also shown in Table 1.

The heat-expandable microspheres after the pH decreasing (to pH of 4) contained 0% of ash and the heat-expandable microspheres after washing also contained 0% of ash.

TABLE 1

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Oily mixture | Monomer | Acrylonitrile (AN) | 170 | 170 | 170 | 170 | 170 | 170 | 170 | 170 | 170 | 170 | 170 |
| | | Methacrylonitrile (MAN) | 70 | 70 | 70 | 70 | 70 | 70 | 70 | 70 | 70 | 70 | 70 |
| | Cross-linking agent | Ethyleneglycol dimethacrylate | 1 | 1 | 1 | 1 | 1 | 1 | 1 | 1 | 1 | 1 | 1 |
| | Polymerization initiator | 2,2′-azobisisobutylonitrile | 1.5 | 1.5 | 1.5 | 1.5 | 1.5 | 1.5 | 1.5 | 1.5 | 1.5 | 1.5 | 1.5 |
| | Blowing agent | Isopentane (iC$_5$) | 60 | 60 | 60 | 60 | 60 | 60 | 60 | 60 | 60 | 60 | 60 |
| Aqueous dispersion medium | H$_2$O | | 891 | 891 | 891 | 891 | 891 | 891 | 891 | 891 | 891 | 891 | 891 |
| | Dispersion stabilizer | Fine-particle Mg(OH)$_2$ | 12 | 12 | 12 | 12 | 12 | 12 | 12 | 12 | 12 | 12 | 12 |
| | | Fine-particle Ca(OH)$_2$ | — | — | — | — | — | — | — | 1.4 | — | — | — |
| | Dispersion stabilizing auxiliary | N-lauryl-N,N-bis (POE(2)) aminoacetic acid betaine | 0.02 | 0.1 | 0.2 | — | — | 0.04 | — | 0.04 | 0.14 | 0.14 | 0.3 |
| | | N-lauryl-N,N-bis (POE(5)) aminoacetic acid betaine | — | — | — | 0.04 | — | — | — | — | — | — | — |
| | | N-lauryl-N,N-bis (POE(15)) aminoacetic acid betaine | — | — | — | — | 0.04 | — | — | — | — | — | — |
| | | N-octyl-N,N-bis (POE(2)) aminoacetic acid betaine | — | — | — | — | — | — | 0.1 | — | — | — | — |
| | pH | | 10.5 | 10.4 | 10.5 | 10.3 | 10.3 | 10.5 | 10.4 | 10.5 | 10.5 | 10.4 | 10.4 |
| Polymerization | Mixing parameters | Rotation and time (rpm × min) | 3500 × 5 | 3500 × 5 | 3500 × 5 | 3500 × 5 | 3500 × 5 | 3500 × 5 | 3500 × 5 | 3500 × 5 | 5000 × 5 | 7000 × 5 | 12000 × 1 |
| | Production stability Y | | ○ | ○ | ○ | ○ | ○ | ○ | ○ | ○ | ○ | ○ | ○ |
| Evaluation | Average particle size (μm) | | 34.7 | 37.5 | 35.5 | 33 | 27.7 | 40 | 28.9 | 33.7 | 18.2 | 14.6 | 7.1 |
| | Encapsulation of blowing agent | Theoretical encapsulation ratio (%) | 20 | 20 | 20 | 20 | 20 | 20 | 20 | 20 | 20 | 20 | 20 |
| | | Encapsulation ratio (%) | 19.2 | 20 | 20 | 19 | 19.7 | 19.2 | 19.8 | 19.1 | 20 | 19.1 | 18.2 |
| | | Evaluation of encapsulation efficiency | 96 | 100 | 100 | 95 | 98.5 | 96 | 99 | 96 | 100 | 96 | 91 |
| | | | ○ | ○ | ○ | ○ | ○ | ○ | ○ | ○ | ○ | ○ | ○ |
| | Expansion performance | Expansion ratio @ 170° C. for 2 min | 7.4 | 10 | 9.6 | 8.7 | 7.5 | 9 | 9.1 | 9.3 | 6.8 | 6.4 | 6.8 |
| | | Expansion ratio @ 180° C. for 2 min | 9.4 | 11.4 | 10.5 | 9.5 | 8.3 | 9.2 | 10.1 | 9.9 | 7.3 | 5.4 | 5.8 |
| | | Expansion ratio @ 190° C. for 2 min | 8.8 | 10.4 | 10.3 | 8.9 | 7.8 | 8.9 | 10.1 | 9.6 | 6.5 | 4.8 | 4.8 |
| | | $T_s$ (° C.) | 127 | 125 | 126 | 130 | 126 | 125 | 127 | 131 | 125 | 125 | 126 |
| | | $T_{max}$ (° C.) | 175 | 180 | 177 | 175 | 173 | 178 | 180 | 177 | 167 | 165 | 160 |
| | | $T_{av}$ (° C.) | 151 | 152.5 | 151.5 | 152.5 | 149.5 | 151.5 | 153.5 | 154 | 146 | 145 | 143 |
| | Blowing agent retention ratio at $T_{av}$ | | 85 | 85 | 82 | 81 | 78 | 80 | 82 | 84 | 88 | 93 | 90 |
| | Evaluation of blowing agent retention ratio | | ○ | ○ | ○ | ○ | ○ | ○ | ○ | ○ | ○ | ○ | ○ |
| | Minerals contained in heat-expandable microspheres | Si (ppm) | 65 | 60 | 100 | 80 | 75 | 120 | 75 | 30 | 150 | 120 | 65 |
| | | Al (ppm) | 0 | 0 | 0 | 0 | 0 | 0 | 0 | 0 | 0 | 0 | 0 |
| | | Mg (ppm) | 9 | 10 | 23 | 40 | 35 | 30 | 5 | 20 | 10 | 60 | 80 |
| | | Ash (%) | 0 | 0 | 0 | 0 | 0 | 0 | 0 | 0 | 0 | 0 | 0 |

As shown in Table 1, the heat-expandable microspheres produced in the process of the present invention exhibited at least 90% of an encapsulation efficiency of a blowing agent, which proves minimum waste of a blowing agent charged in the polymerization step and good expansion performance of the heat-expandable microspheres. The data show that stable oil globules comprising oily mixture existed in an aqueous dispersion medium in the polymerization step and were polymerized into heat-expandable microspheres having good expansion performance.

Comparative Examples 1 to 12

In Comparative examples 1 to 12, heat-expandable microspheres were produced by polymerization in the same manner as that in Example 1 except that the polymerization parameters including the variant and amount of the dispersion stabilizers and dispersion stabilizing auxiliaries and the pH of aqueous dispersion medium were settled as shown in Table 2.

In Comparative example 10, 32 parts of sodium hydroxide aqueous solution (comprising 50 wt % of sodium hydroxide) was not added to the aqueous dispersion medium in the preparation step. Also in Comparative example 10, the polymerization was performed in the aqueous dispersion medium to which a dispersion stabilizer such as fine-particle magnesium hydroxide was not added, being different from Examples and other Comparative examples, but 45 parts of magnesium chloride hexahydrate, a water-soluble metal salt, was added.

In Comparative examples 11 and 12, the polymerization was performed in acidic aqueous dispersion media to which fine-particle magnesium hydroxide was not added as a dispersion stabilizer, while colloidal silica was added to the aqueous dispersion medium of Comparative example 11 and alumina sol was added to the aqueous dispersion medium of Comparative example 12.

In Comparative examples 6, 11 and 12, the heat-expandable microspheres were produced without pH decreasing and washing after the polymerization. The heat-expandable microspheres in Comparative example 6, 11 and 12 respectively contained 2.8%, 6.2% and 6.8% of ash.

The properties of the resultant heat-expandable microspheres were tested and the result is also shown in Table 2.

TABLE 2

| | | | 1 | 2 | 3 | 4 | 5 | 6*2 | 7 | 8 | 9 | 10 | 11*2 | 12*2 |
|---|---|---|---|---|---|---|---|---|---|---|---|---|---|---|
| | | | | | | | | Comparative example | | | | | | |
| Oily mixture | Monomer | Acrylonitrile (AN) | 170 | 170 | 170 | 170 | 170 | 170 | 170 | 170 | 170 | 170 | 170 | 170 |
| | | Methacrylonitrile (MAN) | 70 | 70 | 70 | 70 | 70 | 70 | 70 | 70 | 70 | 70 | 70 | 70 |
| | Cross-linking agent | Ethylene glycol dimethacrylate | 1 | 1 | 1 | 1 | 1 | 1 | 1 | 1 | 1 | 1 | 1 | 1 |
| | Polymerization initiator | 2,2′-azobisisobutylonitrile | 1.5 | 1.5 | 1.5 | 1.5 | 1.5 | 1.5 | 1.5 | 1.5 | 1.5 | 1.5 | 1.5 | 1.5 |
| | Blowing agent | Isopentane (iC5) | 60 | 60 | 60 | 60 | 80 | 60 | 60 | 60 | 60 | 60 | 60 | 60 |
| Aqueous dispersion medium | | $H_2O$ | 891 | 891 | 891 | 891 | 891 | 891 | 891 | 891 | 891 | 891 | 890 | 890 |
| | Dispersion stabilizer | Fine-particle $Mg(OH)_2$ | 12 | 12 | 12 | 12 | 12 | 12 | 12 | 12 | 12 | 0*1 | — | — |
| | | $SiO_2$ | — | — | — | — | — | — | — | — | — | — | 20 | — |
| | | $Al_2O_3$ | — | — | — | — | — | — | — | — | — | — | — | 23 |
| | Dispersion stabilizing auxiliary | Sodium lauryl sulfate | — | 0.075 | 0.15 | 0.225 | 0.15 | 0.15 | — | — | — | — | — | — |
| | | Carboxylic acid-modified polyvinyl alcohol | — | — | — | — | — | — | 0.4 | 8 | 16 | — | — | — |
| | | N-lauryl-N,N-bis (POE(2)) aminoacetic acid betaine | — | — | — | — | — | — | — | — | — | 0.02 | — | — |
| | | Polyvinyl pyrrolidone | — | — | — | — | — | — | — | — | — | — | — | — |
| Polymerization | pH | | 10.3 | 10.4 | 10.4 | 10.4 | 10.3 | 10.4 | 10.4 | 9.8 | 10.1 | 8.3 | 0.8 | 0.8 |
| | Mixing parameters | Rotation and time (rpm × min) | 3500 × 5 | 3500 × 5 | 3500 × 5 | 3500 × 5 | 3500 × 5 | 7000 × 5 | 3500 × 5 | 3500 × 5 | 3500 × 5 | 3500 × 5 | 3.1 | 2.9 |
| | | | | | | | | | | | | | 8000 × 1 | 8000 × 1 |
| Evaluation | Production stability Y | | X | △ | ○ | ○ | ○ | ○ | X | X | △ | X | ○ | ○ |
| | Average particle size (µm) | | — | 28.9 | 24.5 | 26.5 | 26.3 | 18.5 | — | — | 27.5 | — | 17.2 | 15.4 |
| | Encapsulation of blowing agent | Theoretical encapsulation ratio (%) | 20 | 20 | 20 | 20 | 25 | 20 | 20 | 20 | 20 | 20 | 20 | 20 |
| | | Encapsulation ratio (%) | — | 17.4 | 12.1 | 11.4 | 16.8 | 10.2 | — | — | 16.5 | — | 17 | 16.4 |
| | | Encapsulation efficiency (%) | — | 87 | 60.5 | 57 | 67 | 51 | — | — | 83 | — | 85 | 82 |
| | | Evaluation of encapsulation efficiency | — | X | X | X | X | X | — | — | X | — | X | X |
| | Expansion performance | Expansion ratio @ 170° C. for 2 min | — | 6.2 | 4.7 | 3.35 | 4.2 | 4.5 | — | — | 3.1 | — | 5.7 | 5.3 |
| | | Expansion ratio @ 180° C. for 2 min | — | 5.4 | 4.6 | 3.3 | 3.9 | 3.8 | — | — | 2.5 | — | 5.1 | 4.2 |
| | | Expansion ratio @ 190° C. for 2 min | — | 4.3 | 4.7 | 2.7 | 2.4 | 2.8 | — | — | 2.2 | — | 4.2 | 4.1 |
| | | $T_s$ (° C.) | — | 130 | 131 | 129 | 130 | 130 | — | — | 127 | — | 130 | 128 |
| | | $T_{max}$ (° C.) | — | 155 | 150 | 138 | 141 | 150 | — | — | 135 | — | 155 | 156 |
| | | $T_{av}$ (° C.) | — | 142.5 | 140.5 | 133.5 | 135.5 | 140 | — | — | 131 | — | 142.5 | 142 |
| | Blowing agent retention ratio at $T_{av}$ | | — | 65 | 67 | 63 | 58 | 61 | — | — | 56 | — | 67 | 66 |
| | Evaluation of blowing agent retention ratio | | — | X | X | X | X | X | — | — | X | — | X | X |
| | Minerals contained in heat-expandable microspheres | Si (ppm) | — | 67 | 55 | 58 | 70 | 65 | — | — | 80 | — | 60000 | 20 |
| | | Al (ppm) | — | 0 | 0 | 0 | 0 | 0 | — | — | 0 | — | 0 | 63000 |
| | | Mg (ppm) | — | 31 | 10 | 18 | 23 | 26000 | — | — | 17 | — | 42 | 32 |
| | Ash (%) | | — | 0 | 0 | 0 | 0 | 2.8 | — | — | 0 | — | 6.2 | 6.8 |

*¹In Comparative example 10, fine-particle $Mg(OH)_2$ was not used, but 45 parts of $MgCl_2 \cdot 6H_2O$, a water-soluble metal salt, was used.
*²In Comparative examples 6, 11 and 12, heat-expandable microspheres were produced without the pH decreasing and washing after the polymerization step.

In Comparative examples 1, 7, 8 and 10, the polymerization was not stably performed and the resultant polymerization products solidified. Thus, the properties of the microspheres could not be determined and evaluated. Although heat-expandable microspheres could be produced in Comparative examples 2 and 9, the polymerization was not stably performed due to polymerization scale including the agglomeration of polymerization product.

The heat-expandable microspheres produced in Comparative examples 2 to 5 and 9 had low encapsulation efficiency of the blowing agent and low retention ratio of the blowing agent at $T_{av}$, the average of $T_s$ and $T_{max}$, though the heat-expandable microspheres contained 0% of ash. The results are also shown in Table 2.

The heat-expandable microspheres produced in Comparative examples 6, 11 and 12 had low encapsulation efficiency of the blowing agent and low retention ratio of the blowing agent at $T_{av}$.

Example A1

In a separable flask, 20 parts of the heat-expandable microspheres produced in Example 10 and 80 parts of calcium carbonate (Whiten SB Red, manufactured by Bihoku Funka Kogyo Co., Ltd.) were placed and heated with agitation to 150° C. in 5 minutes. Then the mixture was cooled down and screened with a 60-mesh sieve to obtain fine-particle-coated microballoons A having a mean particle size of 40 μm and a true specific gravity of 0.12.

A two-component polyurethane adhesive component (Bond UP Seal Gray, manufactured by Konishi Co., Ltd.) comprising a base component of isocyanate and a curing agent of polyol was prepared. To 80 parts of the curing agent, 4.3 parts of the fine-particle-coated microballoons A was added, and the mixture was agitated with a versatile mixer (5DM-r, manufactured by Shinagawa Machinery Works Co., Ltd) for 20 min. The resultant mixture was agitated and defoamed with a conditioning mixer (AR-360, manufactured by Thinky Corporation) to make an adhesive composition. The adhesive composition was then cured with the parameters mentioned above and the cured adhesive composition was subjected to the tensile test to measure its hardness and elongation. The result is shown in Table 3.

Example A2

A two-component modified-silicone adhesive component (Bond MS Seal, manufactured by Konishi Co., Ltd.) comprising a base component of modified silicone and a curing agent was prepared. To 100 parts of the base component, 2.4 parts of the fine-particle-coated microballoons A produced in Example A1 was added and the mixture was agitated with a versatile mixer for 20 min. Then 8 parts of the curing agent was added to the mixture and further agitated for 20 min. The resultant mixture was agitated and defoamed with a conditioning mixer to make an adhesive composition. The adhesive composition was then cured with the parameters mentioned above and the cured adhesive composition was subjected to the tensile test to measure its hardness and elongation. The result is shown in Table 3.

Comparative Example B1

Fine-particle-coated microballoons B having a mean particle size of 43 μm and a true specific gravity of 0.11 were produced in the same manner as that in Example A1 except that the heat-expandable microspheres produced in Comparative example 11 were used instead of the heat-expandable microspheres produced in Example 10.

Then an adhesive composition was prepared in the same manner as that in Example A1 except that the fine-particle-coated microballoons B were used instead of the fine-particle-coated microballoons A. The hardness and elongation of the cured adhesive composition were determined, and the result is shown in Table 3.

Comparative Example B2

An adhesive composition was prepared in the same manner as that in Example A2 except that the fine-particle-coated microballoons B were used instead of the fine-particle-coated microballoons A. The hardness and elongation of the cured adhesive composition were determined, and the result is shown in Table 3.

Comparative Example C1

Fine-particle-coated microballoons C having a mean particle size of 39 μm and a true specific gravity of 0.12 were produced in the same manner as that in Example A1 except that the heat-expandable microspheres produced in Comparative example 12 were used instead of the heat-expandable microspheres produced in Example 10.

Then an adhesive composition was prepared in the same manner as that in Example A1 except that the fine-particle-coated microballoons C were used instead of the fine-particle-coated microballoons A. The hardness and elongation of the cured adhesive composition were determined, and the result is shown in Table 3.

Comparative Example C2

An adhesive composition was prepared in the same manner as that in Example A2 except that the fine-particle-coated microballoons C were used instead of the fine-particle-coated microballoons A. The hardness and elongation of the cured adhesive composition were determined and the result is shown in Table 3.

TABLE 3

| | | Example | | Comparative example | | | |
| | | | | B1 | B2 | C1 | C2 |
| Base material | Heat-expandable microspheres | A1 Example 10 | A2 Example 10 | Comparative example 11 | Comparative example 11 | Comparative example 12 | Comparative example 12 |
| Fine-particle-coated microballoons | Fine-particle-coated microballoons | A | A | B | B | C | C |
| | Moisture (%)*3 | 0.2 | 0.2 | 0.7 | 0.7 | 0.75 | 0.75 |

TABLE 3-continued

|  |  | Example | | Comparative example | | | |
|  |  |  |  | B1 | B2 | C1 | C2 |
| Base material | Heat-expandable microspheres | A1 Example 10 | A2 Example 10 | Comparative example 11 | Comparative example 11 | Comparative example 12 | Comparative example 12 |
| Cured adhesive composition | Adhesive component | *1 | *2 | *1 | *2 | *1 | *2 |
|  | Hardness (N) | 12.9 | 12.5 | 14 | 13.2 | 14.1 | 13.8 |
|  | Elongation (mm) | 125 | 113 | 97 | 93 | 102 | 92 |
|  | Evaluation | ○ | ○ | x | x | x | x |

*1: two-component polyurethane adhesive component
*2: two-component modified-silicone adhesive component
*3The moisture content of the microballoons was measured with a Karl Fischer moisture meter used for determining the encapsulation ratio of a blowing agent.

The fine-particle-coated microballoons produced in Examples A1 and A2 contained low ratios of silicone and aluminum and low total ratio of silicone and aluminum, and resulted in high retention ratio of a blowing agent. Thus, the microballoons could prevent the increase in the hardness and decrease in the elongation of a cured adhesive composition and contribute to stable manufacture of high-performance adhesive compositions. It is estimated that the low ratio of silicone and aluminum and low total ratio of silicone and aluminum in heat-expandable microspheres contributed to low moisture content in fine-particle-coated microballoons and to stable production of high-performance adhesive compositions.

INDUSTRIAL APPLICABILITY

The process of the present invention reproducibly produces heat-expandable microspheres with high encapsulation efficiency of a blowing agent and high heat-expansion performance. The heat-expandable microspheres of the present invention can be used as the material for decreasing the weight of putty, paint, ink, sealant, mortar, paper clay and pottery. In addition, the heat-expandable microspheres of the present invention can be blended in matrix resins that are processed by injection molding, extrusion molding or pressure molding into foamed articles having good sound insulation property, thermal insulation property, heat shielding property and sound absorbency.

REFERENCE SIGNS LIST

11 Shell of a thermoplastic resin
12 Blowing agent
1 Microballoon (fine-particle-coated microballoon)
2 Shell
3 Hollow
4 Fine particle (in a state of adhesion)
5 Fine particle (in a state of fixation in a dent)

The invention claimed is:

1. A process for producing heat-expandable microspheres comprising essentially a shell of thermoplastic resin and a blowing agent encapsulated therein:
   wherein the process comprises the steps of:
   dispersing a polymerizable component and the blowing agent in a basic aqueous dispersion medium having a pH ranging from 9.5 to 12 and containing a colloid of a fine-particle metal compound and an amphoteric surfactant, the amphoteric surfactant being a betaine amphoteric surfactant, the betaine amphoteric surfactant being alkylene oxide adduct betaine amphoteric surfactant, where the colloid of the fine-particle metal compound is prepared by a process in which a water soluble metal salt is dissolved in an acidic or neutral aqueous medium and a basic compound is added to the medium, and where an amount of the amphoteric surfactant ranges from 0.001 to 40 parts by weight to 100 parts by weight of the fine-particle metal compound,
   polymerizing the polymerizable component; and
   decreasing a pH of the heat-expandable microspheres produced in the polymerization step where the pH is brought down to 6.0 or less.

2. A process for producing heat-expandable microspheres comprising essentially a shell of thermoplastic resin and a blowing agent encapsulated therein:
   wherein the process comprises the steps of:
   dispersing a polymerizable component and the blowing agent in a neutral or basic aqueous dispersion medium having a pH ranging from 9.5 to 12 and containing a colloid of a fine-particle metal compound and an amphoteric surfactant, the amphoteric surfactant being a betaine amphoteric surfactant, where the colloid of the fine-particle metal compound is prepared by a process in which a water soluble metal salt is dissolved in an acidic or neutral aqueous medium and a basic compound is added to the medium, and where an amount of the amphoteric surfactant ranges from 0.001 to 40 parts by weight to 100 parts by weight of the fine-particle metal compound,
   polymerizing the polymerizable component, wherein the betaine amphoteric surfactant is at least one alkylene oxide adduct betaine amphoteric surfactant selected from the group consisting of N-octyl-N,N-bis (POE (m)) aminoacetic acid betaine, N-lauryl-N,N-bis (POE (m)) aminoacetic acid betaine, N-myristyl-N,N-bis (POE(m)) aminoacetic acid betaine and N-stearyl-N,N-bis (POE(m)) aminoacetic acid betaine, where POE of POE (m) represents polyoxyethylene group, and m is a positive integer ranging from 1 to 30 representing the mole number of POE in the adducts; and
   decreasing a pH of the heat-expandable microspheres produced in the polymerization step where the pH is brought down to 6.0 or less.

3. The process for producing heat-expandable microspheres according to claim 1, wherein the encapsulation efficiency of the blowing agent is at least 90% in the heat-expandable microspheres.

4. The process for producing heat-expandable microspheres according to claim 1, wherein the polymerizable component contains at least one component selected from the group consisting of nitrile monomers, (meth)acrylate monomers, carboxyl-group-comprising monomers, styrene monomers, vinyl acetate, acrylamide monomers, maleimide monomers and vinylidene chloride.

5. The process for producing heat-expandable microspheres according to claim 1, further comprising a step of washing the heat-expandable microspheres after the polymerization step.

6. The process for producing heat-expandable microspheres according to claim 1, further comprising a step of washing the heat-expandable microspheres after the pH decreasing step.

7. The process for producing heat-expandable microspheres according to claim 2, wherein m ranges from 2 to 30.

8. The process for producing heat-expandable microspheres according to claim 1, wherein the colloid of the fine-particle metal compound comprises a salt or hydroxide of alkali earth metal.

9. The process for producing heat-expandable microspheres according to claim 1, wherein the water soluble metal salt comprises a metallic cation of alkali earth metal and a halide ion.

10. The process for producing heat-expandable microspheres according to claim 1, wherein the heat-expandable microspheres comprise not more than 500 ppm of silicon, not more than 350 ppm of aluminum, and not more than 600 ppm of silicon and aluminum in total.

* * * * *